(12) United States Patent
Murahashi et al.

(10) Patent No.: US 10,109,077 B2
(45) Date of Patent: Oct. 23, 2018

(54) IMAGE GENERATION DEVICE AND DISPLAY DEVICE

(71) Applicant: SHARP KABUSHIKI KAISHA, Osaka-shi, Osaka (JP)

(72) Inventors: Yoshimitsu Murahashi, Osaka (JP); Takashi Mine, Osaka (JP); Naoki Shiobara, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 67 days.

(21) Appl. No.: 14/910,768

(22) PCT Filed: Jul. 10, 2014

(86) PCT No.: PCT/JP2014/068436
§ 371 (c)(1),
(2) Date: Feb. 8, 2016

(87) PCT Pub. No.: WO2015/029613
PCT Pub. Date: Mar. 5, 2015

(65) Prior Publication Data
US 2016/0203617 A1      Jul. 14, 2016

(30) Foreign Application Priority Data

Aug. 28, 2013   (JP) .................................. 2013-176941

(51) Int. Cl.
*G09G 5/377*   (2006.01)
*G09G 5/00*    (2006.01)
(Continued)

(52) U.S. Cl.
CPC .......... *G06T 11/001* (2013.01); *G06F 3/1446* (2013.01); *G06T 11/60* (2013.01);
(Continued)

(58) Field of Classification Search
CPC ....... G06T 11/001; G06T 11/60; G06T 15/30; G06T 3/4007; G09G 5/14; G09G 5/393;
(Continued)

(56) References Cited

U.S. PATENT DOCUMENTS

| 2003/0197715 A1* | 10/2003 | Hosokawa | G06T 11/00 345/619 |
| 2007/0297753 A1* | 12/2007 | Usui | H04N 5/44591 386/264 |
| 2012/0038669 A1* | 2/2012 | Lee | G06F 3/011 345/633 |

FOREIGN PATENT DOCUMENTS

JP      2006-013618 A     1/2006

* cited by examiner

*Primary Examiner* — Ke Xiao
*Assistant Examiner* — Andrew Shin
(74) *Attorney, Agent, or Firm* — Keating & Bennett, LLP

(57) ABSTRACT

A purpose of the present invention is to implement, by specifying a process target area, an image generation device which generates an image (video) from which an image quality improving effect can be recognized and a display device which displays the image. An image generation device (1000) includes a screen duplication unit (1), a mask area determination unit (2), a composition unit (3), and an image quality adjustment unit (4). The screen duplication unit (1) extracts and outputs at least a part of an image area of an input image as a process target image. The mask area determination unit (2) determines a mask area of the process target image and generates a mask image specifying the mask area. The image quality adjustment unit (4) performs predetermined image process to the mask area, which is determined by the mask area determination unit (2) in the process target image and outputs the image, to which the image process is performed, as an image after image quality adjustment. The composition unit (3) acquires a composited (Continued)

image in which the process target image, the mask image, and the image after the image quality adjustment are composited so that the process target image, the mask image, and the image after the image quality adjustment are displayed on a display screen.

8 Claims, 20 Drawing Sheets

(51) Int. Cl.
*G06T 11/60* (2006.01)
*G06T 11/00* (2006.01)
*H04N 5/445* (2011.01)
*H04N 21/431* (2011.01)
*G06F 3/14* (2006.01)
*G09G 5/36* (2006.01)

(52) U.S. Cl.
CPC ............... *G09G 5/00* (2013.01); *G09G 5/36* (2013.01); *G09G 5/377* (2013.01); *H04N 5/44591* (2013.01); *G09G 2300/026* (2013.01); *G09G 2320/0233* (2013.01); *G09G 2320/0242* (2013.01)

(58) Field of Classification Search
CPC ........... G09G 2340/0407; G09G 5/391; G09G 5/377; G09G 5/00; H04N 5/44591; H04N 21/4316; H04N 21/4318
USPC ....... 345/581, 619, 620, 625, 626, 629, 634, 345/660, 667, 671
See application file for complete search history.

IMAGE GENERATION DEVICE AND DISPLAY DEVICE

TECHNICAL FIELD

The present invention relates to a display technology which shows, for example, an image quality improving effect by dividing a display screen into a plurality of display areas and displaying predetermined images (videos) in the divided display areas.

BACKGROUND ART

There have been a display device which displays an image before image quality adjustment and an image after image quality adjustment on divided areas formed by dividing a display screen into a plurality areas and shows the image quality adjustment effect to a user (for example, see Patent Literature 1 (JP 2006-13618 A)).

With the display device, since the image before the image quality adjustment and the image after the image quality adjustment are simultaneously displayed on the screen, it is possible to easily recognize the image quality adjustment effect in the case where the image quality adjustment strongly affects a wide image area.

SUMMARY OF INVENTION

Technical Problem

However, it is difficult for everyone to recognize the difference in, for example, an image quality adjustment process which affects a certain image area or image quality adjustment which affects a detail of an image with the above display device.

When an expert views the images displayed on the display device, the expert knows points to recognize an image quality adjustment effect and can recognize the image quality adjustment effect. However, when a normal user views the images displayed on the display device, the normal user does not know which points to view and cannot appropriately recognize the image quality adjustment effect.

For example, in the case where although a predetermined image adjustment process is performed to a desired image area, the difference between an image before the image quality adjustment and an image after the image quality adjustment cannot be clearly recognized, it is difficult for a normal user to distinguish reasons that the image quality improving effect cannot be recognized because (1) the intensity of the image adjustment process is weak, or (2) the image adjustment process has not been performed to the desired image area.

In other words, in the case where although a predetermined image adjustment process is performed to a desired image area, the difference between an image before the image quality adjustment and an image after the image quality adjustment cannot be clearly recognized, it is difficult for a normal user to distinguish (1) the problem about the process intensity from (2) the problem about the setting of the process target area.

In view of the above problems, a purpose of the present invention is to implement an image generation device which generates an image (video), from which an image quality improving effect can be easily recognized, and a display device which displays the image.

Solution to Problem

In order to solve the above problems, an image generation device having a first configuration includes a screen duplication unit, a mask area determination unit, an image quality adjustment unit, and a composition unit.

The screen duplication unit extracts and outputs at least a part of an image area of an input image as a process target image.

The mask area determination unit determines a mask area of the process target image and generates a mask image specifying the mask area.

The image quality adjustment unit performs a predetermined image process to the mask area, which is determined by the mask area determination unit, of the process target image and outputs the image, to which the image process is performed, as an image after image quality adjustment.

The composition unit acquires a composite image in which the process target image, the mask image, and the image after the image quality adjustment are composited so that the process target image, the mask image, and the image after the image quality adjustment are displayed on a display screen.

Advantageous Effects of Invention

According to the present invention, by specifying a process target area, it is possible to easily implement an image generation device which generates an image (video), from which an image quality improving effect can be recognized, and a display device which displays the image.

DESCRIPTION OF EMBODIMENTS

First Embodiment

Herein after, a first embodiment will be described with reference to the drawings.

<1.1: Configuration of Image Generation Device>

Figure 1:
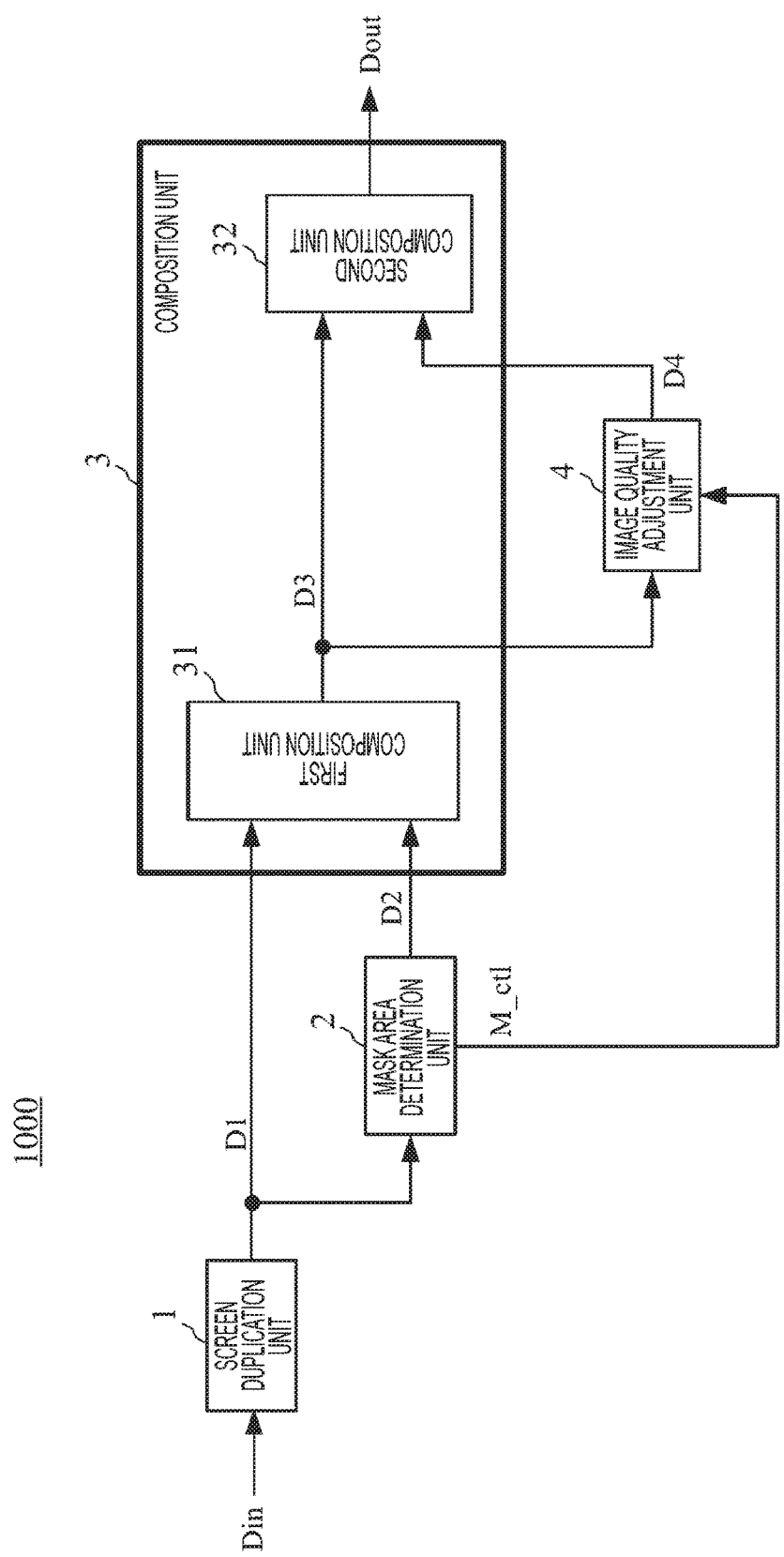
FIG. 1 is a block diagram schematically illustrating an image generation device 1000 according to a first embodiment.

FIG. 1 is a block diagram schematically illustrating an image generation device 1000 according to the first embodiment.

As illustrated in FIG. 1, the image generation device 1000 includes a screen duplication unit 1, a mask area determination unit 2, a composition unit 3, and an image quality adjustment unit 4.

The screen duplication unit 1 extracts an image area having ⅓ or less of an input image Din, and generates a composite image (image forming a screen (for example, a frame image)) by duplicating the extracted image area. The screen duplication unit 1 outputs a composite image (composite duplicate image) D1 to the mask area determination unit 2 and the composition unit 3.

Figure 2:
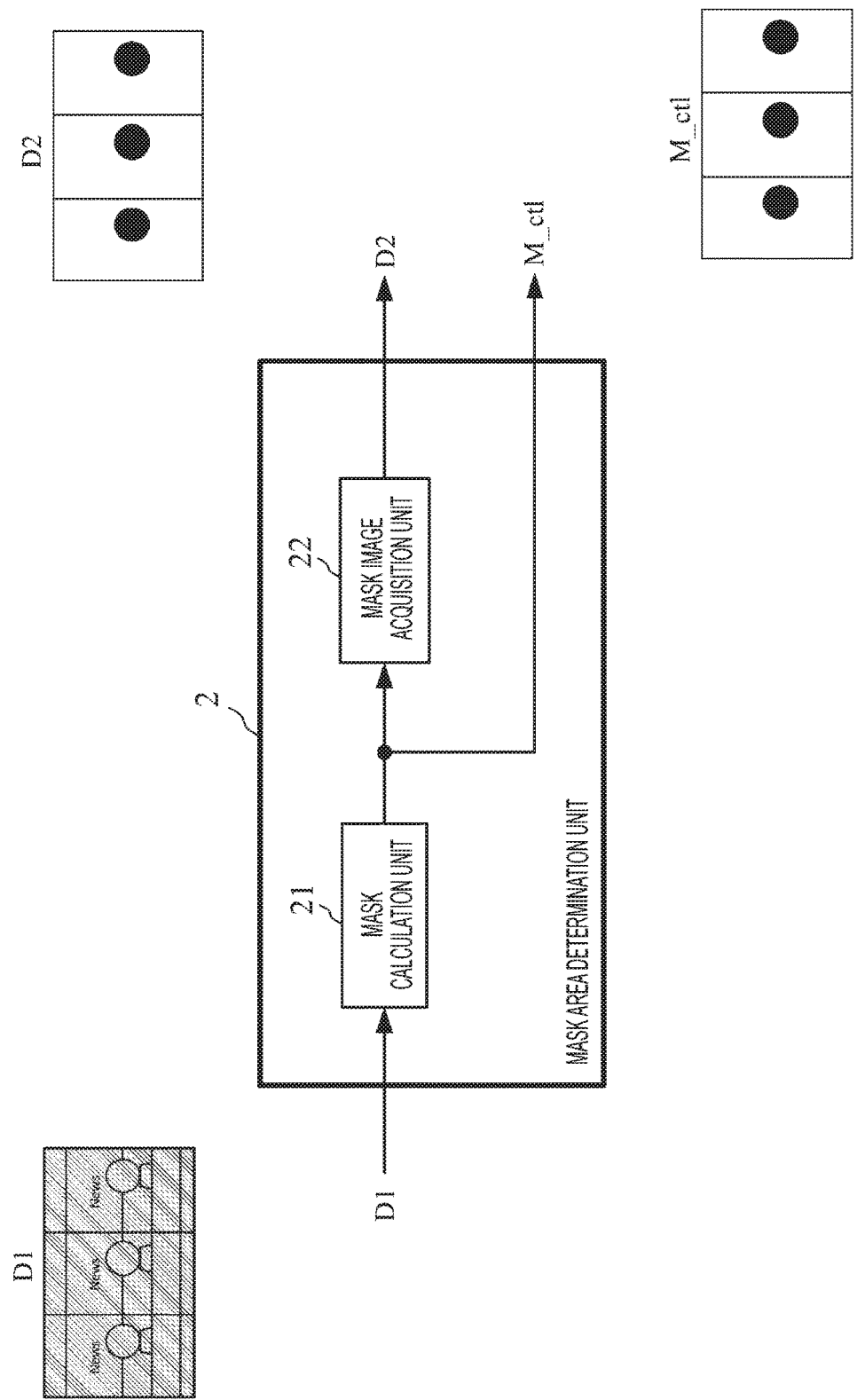
FIG. 2 is a block diagram schematically illustrating a mask area determination unit 2.

As illustrated in FIG. 2, the mask area determination unit 2 includes a mask calculation unit 21 and a mask image acquisition unit 22.

The mask calculation unit 21 receives the composite duplicate image D1 output from the screen duplication unit 1 and determines, based on the received the composite duplicate image D1, a mask area (detailedly described later). Then, the mask calculation unit 21 outputs a signal indicating a determined mask area (mask area instruction signal) M_ctl to the mask image acquisition unit 22 and the image quality adjustment unit 4.

The mask image acquisition unit 22 receives the mask area instruction signal M_ctl output from the mask calculation unit 21. The mask image acquisition unit 22 generates, according to the received mask area instruction signal M_ctl, an image specifying the mask area (mask image) D2.

Then, the mask image acquisition unit 22 outputs the generated mask image D2 to the composition unit 3.

As illustrated in FIG. 1, the composition unit 3 includes a first composition unit 31 and a second composition unit 32.

The first composition unit 31 receives the composite duplicate image D1 output from the screen duplication unit 1 and the mask image D2 output from the mask area determination unit 2. The first composition unit 31 generates a composite image D3 by compositing the composite duplicate image D1 and the mask image D2. Then, the first composition unit 31 outputs the generated composite image D3 to the second composition unit 32 and the image quality adjustment unit 4.

The second composition unit 32 receives the composite image D3 output from the first composition unit 31 and an image quality adjustment image D4 (described later) output from the image quality adjustment unit 4. The second composition unit 32 generates and outputs an output image Dout by compositing the composite image D3 and the image quality adjustment image D4.

The image quality adjustment unit 4 receives the composite image D3 output from the first composition unit 31 and the mask area instruction signal M_ctl output from the mask calculation unit 21 of the mask area determination unit 2. The image quality adjustment unit 4 performs a predetermined image process (image quality adjustment process) to the image area determined according to the mask area instruction signal M_ctl. Then, the image quality adjustment unit 4 outputs, to the second composition unit 32 of the composition unit 3, the image to which the image process (image quality adjustment process) is performed (image quality adjustment image) D4.

Figure 3:
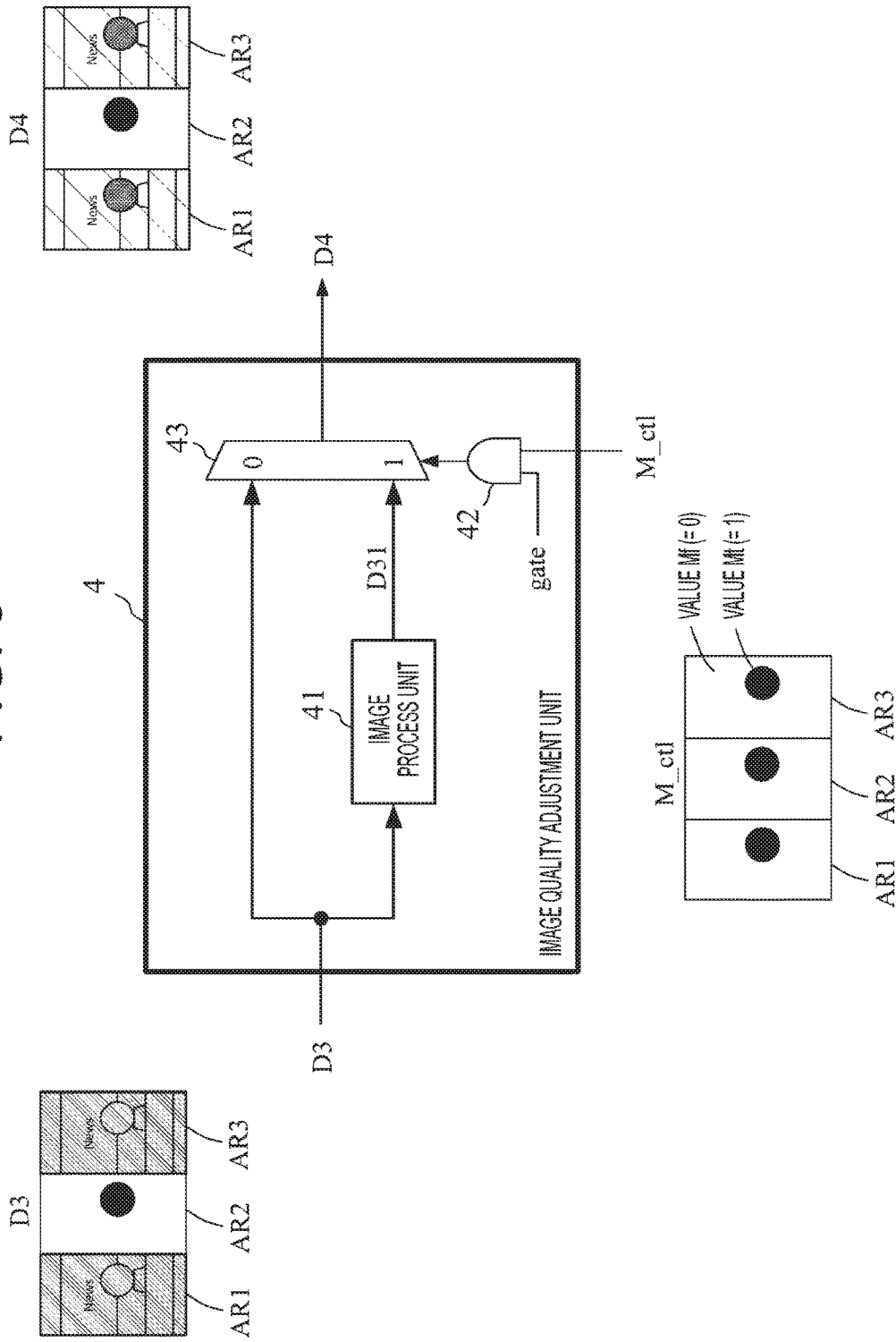
FIG. 3 is a block diagram schematically illustrating an image quality adjustment unit 4.

The image quality adjustment unit 4 is configured as illustrated in, for example, FIG. 3 when the mask area instruction signal M_ctl generated by the mask area determination unit 2 is a binary signal indicating "0" or "1". The image quality adjustment unit 4 in this case includes an image process unit 41, a gate unit 42, and a selector 43.

The image process unit 41 receives the composite image D3 output from the first composition unit 31 and performs a predetermined image process to the received composite image D3. Then, the image process unit 41 outputs an image after the image process D31 (image signal D31) to the selector 43.

The gate unit 42 receives the mask area instruction signal M_ctl output from the mask calculation unit 21 and a gate signal gate. The gate unit 42 outputs the mask area instruction signal M_ctl to the selector 43 when the gate signal gate is active (for example, "1"), and outputs "0" to the selector 43 when the gate signal gate is inactive (for example, "0"). The gate unit 42 can be implemented with, for example, an AND gate.

The selector 43 receives the composite image D3 output from the first composition unit 31 and the image processed image D31 output from the image process unit 41. The selector 43 selects the image D3 when the output from the gate unit 42 is "0", and selects the image D31 when the output from the gate unit 42 is "1". The selector 43 outputs the selected image (image signal) to the second composition unit 32 of the composition unit 3 as the image D4 (image signal D4).

Figure 4:
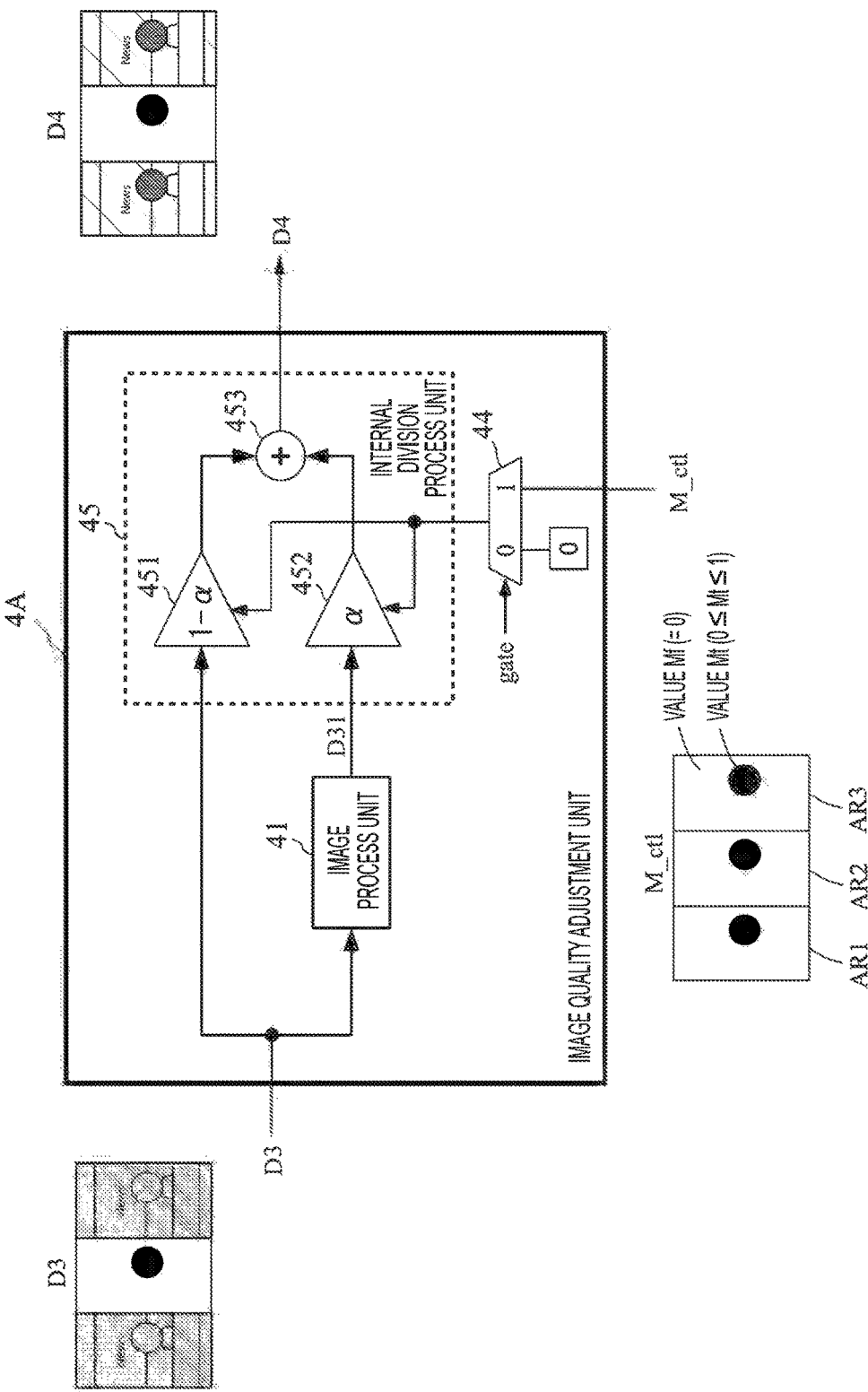
FIG. 4 is a block diagram schematically illustrating an image quality adjustment unit 4A.

Furthermore, the image quality adjustment unit 4 is configured as illustrated in, for example, FIG. 4 when the mask area instruction signal M_ctl generated by the mask area determination unit 2 is a signal indicating an intermediate value of 0 to 1. An image quality adjustment unit 4A in this case includes an image process unit 41, a gate selector 44, and an internal division process unit 45. In this case, the image quality adjustment unit 4 of the image generation device 1000 as illustrated in FIG. 1 may be replaced with the image quality adjustment unit 4A illustrated in FIG. 4.

The image process unit 41 receives the composite image D3 output from the first composition unit 31 and performs a predetermined image process to the received composite image D3. Then, the image process unit 41 outputs an image after the image process D31 (image signal D31) to the selector 43.

The gate selector 44 receives the mask area instruction signal M_ctl output from the mask calculation unit 21 and a fixed value "0". The gate selector 44 outputs the mask area instruction signal M_ctl to the internal division process unit 45 when the gate signal gate is active (for example, "1"), and outputs "0" to the internal division process unit 45 when the gate signal gate is inactive (for example, "0").

As illustrated in FIG. 4, the internal division process unit 45 includes a first coefficient multiplication unit 451, a second coefficient multiplication unit 452, and an adder 453.

The first coefficient multiplication unit 451 receives the composite image D3 output from the first composition unit 31 and multiplies the received composite image D3 by a coefficient $(1-\alpha)$. In other words, the first coefficient multiplication unit 451 multiplies the pixel value (signal value) of each pixel of the composite image D3 by the coefficient $(1-\alpha)$. Then, the first coefficient multiplication unit 451 outputs, to the adder 453, the image (image signal) formed according to the multiplied pixel value.

Note that, the coefficient $\alpha$ is the output from the gate selector 44, and the coefficient $\alpha$ is the signal value of the mask area instruction signal M_ctl when the gate signal gate is "1".

The second coefficient multiplication unit 452 receives the image processed image D31 output from the image process unit 41 and multiplies the received image D31 by the coefficient $\alpha$. In other words, the second coefficient multiplication unit 452 multiplies the pixel value (signal value) of each pixel of the image D31 by the coefficient $\alpha$. Then, the second coefficient multiplication unit 452 outputs, to the adder 453, the image (image signal) formed according to the multiplied pixel value.

Note that, the coefficient $\alpha$ is the output from the gate selector 44, and the coefficient $\alpha$ is the signal value of the mask area instruction signal M_ctl when the gate signal gate is "1".

The adder 453 receives the outputs from the first coefficient multiplication unit 451 and the second coefficient multiplication unit 452, and adds the outputs. Then, the adder 453 outputs the added image (image signal) to the second composition unit 32 as the image D4 (image signal D4).

In other words, the internal division process unit 45 performs an internal division process to the image D3 and the image D31 by an internal division ratio $\alpha$ according to the equation $$D4=(1-\alpha)\times D3+\alpha\times D31 \text{ where}$$

$0 \leq \alpha \leq 1$, and outputs the image after the internal division process to the second composition unit 32 as the image D4.

<1.2: Operation of Image Generation Device>

Hereinafter, the operation of the image generation device 1000 having the above configuration will be described.

Figure 5:
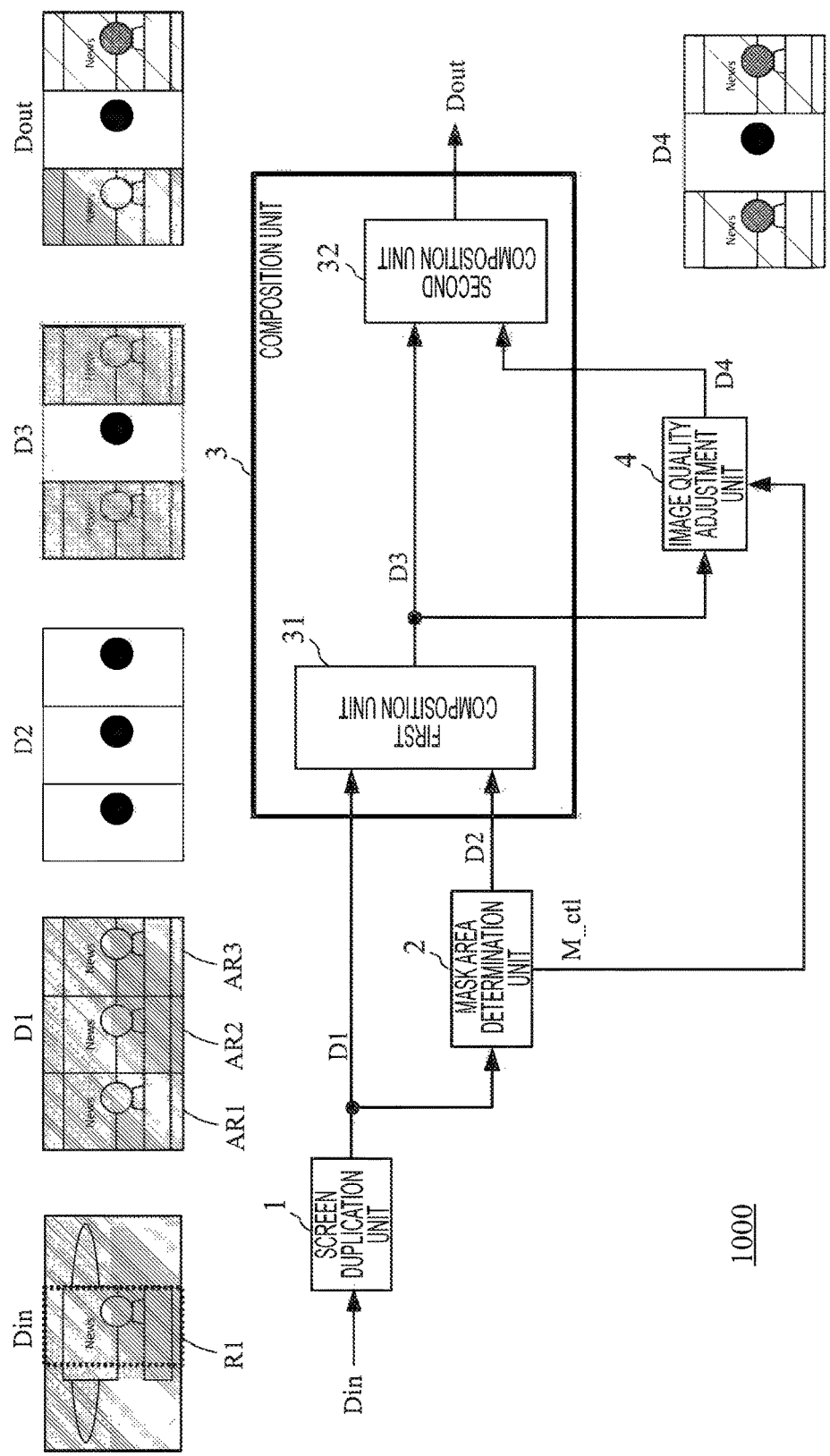
FIG. 5 is a diagram illustrating a schematic configuration of the image generation device 1000 and examples of images Din, D1, D2, D3, D4, and Dout.

FIG. 5 is a diagram illustrating a schematic configuration of the image generation device 1000 and examples of the images Din, D1, D2, D3, D4, and Dout.

Hereinafter, the case where the image Din illustrated in FIG. 5 is input to the image generation device 1000 will be described as an example.

The image Din illustrated in FIG. 5 is input to the screen duplication unit 1.

In the screen duplication unit 1, an image area having ⅓ or less of an input image Din is extracted, and a composite image (image forming a screen (for example, a frame image)) is generated by duplicating the extracted image.

Figure 6:
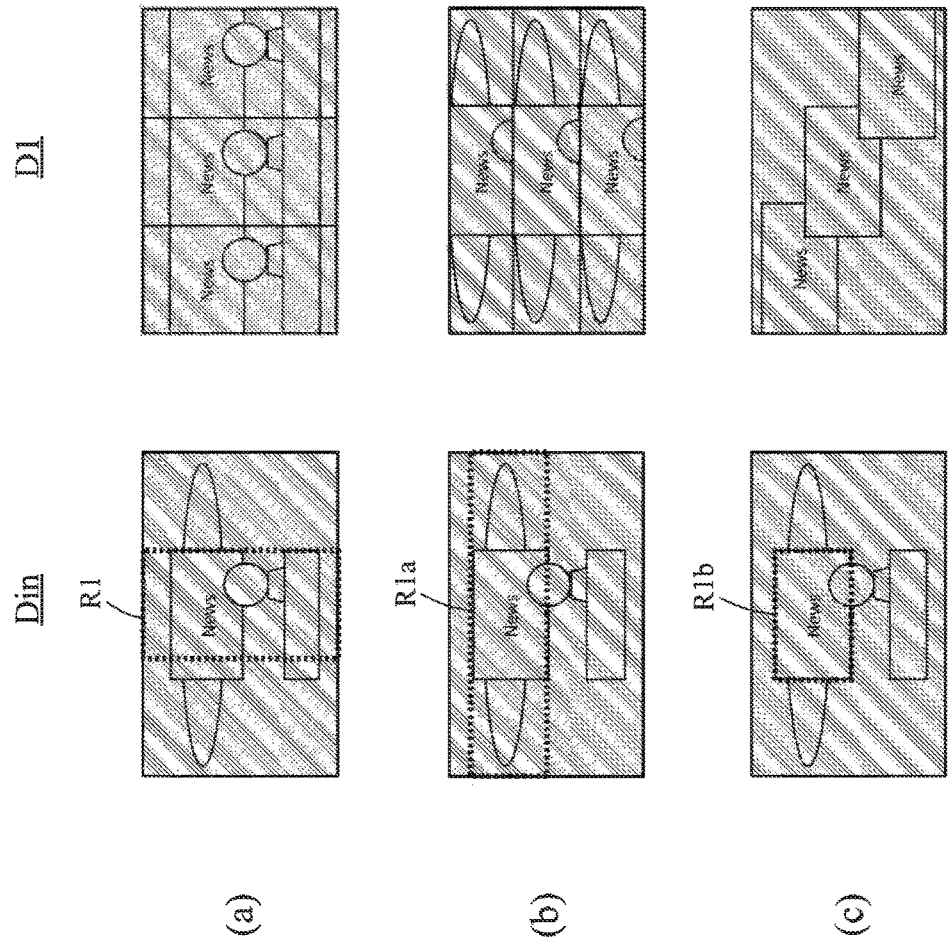
FIGS. 6(a) to 6(c) are diagrams schematically illustrating examples of a duplication process in a screen duplication unit 1.

FIG. 6 is a diagram schematically illustrating examples of the duplication process in the screen duplication unit 1.

As illustrated in FIG. 6(*a*), in the screen duplication unit 1, an image area R1 is extracted, and the composite duplicate image D1 (right image in FIG. 6(*a*)) is generated by duplicating the image area R1 so as to arrange the three image areas R1 laterally. Alternatively, as illustrated in FIG. 6(*b*), in the screen duplication unit 1, an image area R1a is extracted, and the composite duplicate image D1 (right image in FIG. 6(*b*)) is generated by duplicating the image area R1a so as to arrange the three image areas R1a vertically. Alternatively, as illustrated in FIG. 6(*c*), in the screen duplication unit 1, an image area R1b is extracted, and the composite duplicate image D1 (right image in FIG. 6(*c*)) is generated by duplicating the image area R1b so as to arrange the three image areas R1b obliquely.

Hereinafter, as illustrated in FIG. 6(*a*), it will be described the case where the image area R1 is duplicated by the screen duplication unit 1 so as to arrange the three image areas R1, and the composite duplicate image D1 (right image of FIG. 6(*a*)) is generated.

The composite duplicate image D1 generated by the screen duplication unit 1 in the above described manner is output to the mask calculation unit 21 of the mask area determination unit 2 and the first composition unit 31 of the composition unit 3.

In the mask calculation unit 21, a mask area (process target area) is determined from the input composite duplicate image D1. For example, when the mask area (process target area) is a skin color area, the mask calculation unit 21 detects the skin color area in the composite duplicate image D1, sets the signal value corresponding to the pixel included in the detected area to Mt (for example, "1") and the signal value (pixel value) corresponding to the pixel included in other areas to Mf (for example, "0"), and acquires the set mask signal M_ctl. Then, the acquired mask signal M_ctl is output to the mask image acquisition unit 22 and the image quality adjustment unit 4.

The mask area (process target area) determined by the mask calculation unit 21 is not limited to a detection area having a certain color as described above. For example, the mask calculation unit 21 may detect a contour area or a texture area in the composite duplicate image D1 and determine (set) the detected image area as the mask area (process target area).

Furthermore, the mask calculation unit 21 may detect a certain object by performing an advanced object recognition process, such as face detection, and determine (set) the image area equivalent to the detected object as the mask area (process target area).

Moreover, the mask signal M_ctl indicating the mask area (process target area) is not limited to the binary signal indicating the signal value of "0" or "1" as described above. For example, the mask signal M_ctl may be a multi-value signal indicating a multi-value into which 0 to 1 is divided. Furthermore, the mask signal M_ctl may be a signal indicating an intermediate value of 0 to 1. Note that, it has been described that the range which the signal value of the mask signal M_ctl may indicate is normalized to 0 to 1, and the signal value is not limited to the above. For example, the mask signal M_ctl may be an 8 bits-signal indicating a value of 0 to 255.

Furthermore, the mask calculation unit 21 may acquire the mask signal M_ctl based on likelihood as disclosed in, for example, JP 2012-265454 A. Specifically, the mask calculation unit 21 may set likelihood according to a predetermined feature (for example, image feature amount) inclusion degree in an image area (for example, detection target object) and acquire the mask signal M_ctl based on the set likelihood.

The mask signal M_ctl acquired by the mask calculation unit 21 may be a signal other than the above signals as long as the signal controls the image quality adjustment at the image quality adjustment unit 4.

The mask signal M_ctl generated by the mask calculation unit 21 in the above described manner is output to the mask image acquisition unit 22 and the image quality adjustment unit 4.

In the mask image acquisition unit 22, the image corresponding to the mask signal M_ctl output from the mask calculation unit 21 is acquired. In other words, the mask image acquisition unit 22 converts the signal value (mask value) of the mask signal M_ctl into an image signal (video signal) format.

For example, the mask image acquisition unit 22 converts the signal value (mask value) of the mask signal M_ctl into the image signal (video signal) format by the following (1) and (2) procedures.

(1) When the signal value of the mask signal M_ctl corresponding to a pixel P1 (x1,y1) (the pixel of the image on the coordinates (x1,y1)) is Mt, the mask image acquisition unit 22 sets a red component value R (x1,y1), a green component value G (x1,y1), and a blue component value B (x1,y1) of the pixel P1 (x1,y1) to R (x1,y1)=255,
G (x1,y1)=0, and
B (x1,y1)=0 respectively so that the pixel P1 (x1,y1) is displayed in "red". Note that, RGB of each pixel is expressed by a gradation value of 8 bits (0 to 255).

Furthermore, when the signal value Mt of the mask signal M_ctl indicates the intermediate value of 0 to 1, the mask image acquisition unit 22 may set the red component value R (x1,y1), the green component value G (x1,y1), and the blue component value B (x1,y1) of the pixel P1 (x1,y1) to R (x1,y1)=255×Mt,
G (x1,y1)=0, and
B (x1,y1)=0 where
0≤Mt≤1 respectively so that the pixel P1 (x1,y1) is displayed in "red".

(2) When the signal value of the mask signal M_ctl corresponding to a pixel P1 (x1,y1) (the pixel of the image on the coordinates (x1,y1)) is Mf, the mask image acquisition unit 22 sets the red component value R (x1,y1), the green component value G (x1,y1), and the blue component value B (x1,y1) of the pixel P1 (x1,y1) to R (x1,y1)=0,
G (x1,y1)=0, and
B (x1,y1)=0 respectively so that the pixel P1 (x1,y1) is displayed in "black".

The process in the case where each color component in the RGB color space is format-converted into an image signal (video signal) indicating a value of 8 bits has been described in the above description. The signal is not limited to this, and the mask image acquisition unit 22 may convert the signal value (mask value) of the mask signal M_ctl into an image signal (video signal) of other color spaces (for example, YCbCr color space). Furthermore, the number of bits is not limited to 8 bits.

The image signal (video signal) acquired by the above (1) and (2) procedures, that is, the image signal (video signal), where the area, in which the signal value of the mask signal M_ctl is Mt, is displayed in "red", and the area, in which the signal value of the mask signal M_ctl is Mf, is displayed in "black", is output from the mask image acquisition unit 22 to the first composition unit 31 of the composition unit 3 as the image signal (mask image signal) D2.

In the first composition unit 31 of the composition unit 3, the composite duplicate image D1 output from the screen duplication unit 1 and the mask image D2 output from the mask image acquisition unit of the mask area determination unit 2 (the image formed by the mask image signal) are composited. Specifically, in the first composition unit 31, a composition process is performed so that an area AR2 (middle image area of the image divided into three as illustrated in FIG. 5) of the composite duplicate image D1 illustrated in FIG. 5 is replaced with the area AR2 (middle image area of the image divided into three as illustrated in FIG. 5) of the mask image D2 illustrated in FIG. 5. The first composition unit 31 controls, based on, for example, a vertical synchronizing signal (VD signal), a horizontal synchronizing signal (HD signal), or an enable signal, to select and output the composite duplicate image signal D1 (composite duplicate image D1) in an area AR1 (left image area of the image divided into three as illustrated in FIG. 5) and an area AR3 (right image area of the image divided into three as illustrated in FIG. 5), and to select and output the mask image signal D2 (mask image D2) in the area AR2. The composition process can be performed accordingly. Alternatively, the first composition unit 31 may select and output, based on coordinate information on the area AR2 (for example, the lower left endpoint coordinates and the lower right endpoint coordinates of the area AR2), the composite duplicate image signal D1 (composite duplicate image D1) in the area AR1 and the area AR3, and select and output the mask image signal D2 (mask image D2) in the area AR2.

The image (image signal) composited by the first composition unit 31 in this manner is output from the first composition unit 31 to the second composition unit 32 and the image quality adjustment unit 4 as the composite image D3 (composite image signal D3).

As illustrated in FIG. 3, in the image quality adjustment unit 4, the composite image D3 output from the first composition unit 31 is input.

In the image process unit 41 of the image quality adjustment unit 4, a predetermined image process (for example, image quality adjustment process) is performed to the composite image D3, and the image processed image D31 (image signal D31) is output to the selector 43.

In the gate unit 42 of the image quality adjustment unit 4, the mask area instruction signal M_ctl output from the mask calculation unit 21 is output to the selector 43 based on the gate signal gate. In other words, the mask area instruction signal M_ctl is output to the selector 43 when the gate signal gate is active (for example, "1"), and "0" is output to the selector 43 when the gate signal gate is inactive (for example, "0").

In the selector 43, either of the composite image D3 or the image processed image D31 by the image process unit 41 is selected and output according to the output from the gate unit 42. For example, as illustrated in FIG. 3, when the value of the mask area instruction signal M_ctl indicates Mt (=1) in the circular area in the substantially center and the value indicates Mf (=0) in other areas, the gate signal gate is activated only in the areas AR1 and AR2 and deactivated in the area AR2. Thus, in the area AR1 and the area AR3, the image signal D31 is selected in the area, where the value of the mask area instruction signal M_ctl is Mt (=1) in the circular area in the substantially center, and the composite image D3 is selected in other areas.

With those processes, in the area AR1 and the area AR3, (1) the image processed image (image signal) D31 by the image process unit 41 is output in the area where the value of the mask area instruction signal M_ctl is Mt (=1), and (2) the composite image D3 is output in the area where the value of the mask area instruction signal M_ctl is Mf (=0).

It has been described that the gate signal gate is activated in the area AR1 and the area AR3. The gate signal gate is not limited to the above, and may be activated only in, for example, the area AR3. In this case, the areas AR1 and AR2 of the image D4 output from the selector 43 are similar to the composite image D3, and only in the area AR3, (1) the image processed image (image signal) D31 by the image process unit 41 is output from the selector 43 in the area where the value of the mask area instruction signal M_ctl is Mt (=1), and (2) the composite image D3 is output from the selector 43 in the area where the value of the mask area instruction signal M_ctl is Mf (=0).

The image D4 (image signal D4) generated in this manner is output from the image quality adjustment unit 4 to the second composition unit 32 of the composition unit 3.

It has been described the case where the mask area instruction signal M_ctl is binary, that is, indicates "0" or "1". When the mask area instruction signal M_ctl indicates an intermediate value of 0 to 1, the image quality adjustment unit 4 is replaced with the image quality adjustment unit 4A and the following processes may be performed in the image quality adjustment unit 4A.

As illustrated in FIG. 4, in the image quality adjustment unit 4A, the composite image D3 output from the first composition unit 31 is input.

The composite image D3 is input to the first coefficient multiplication unit 451 of the internal division process unit 45 and the image process unit 41.

In the image process unit 41 of the image quality adjustment unit 4A, a predetermined image process (for example, image quality adjustment process) is performed to the composite image D3, and the image processed image D31 (image signal D31) is output to the second coefficient multiplication unit 452 of the internal division process unit 45.

In the gate selector 44 of the image quality adjustment unit 4, the mask area instruction signal M_ctl output from the mask calculation unit 21 or the fixed value "0" is outputs to the internal division process unit 45 based on the gate signal gate. In other words, the mask area instruction signal M_ctl is output to the internal division process unit 45 when the gate signal gate is active (for example, "1"), and "0" is output to the internal division process unit 45 when the gate signal gate is inactive (for example, "0").

In the first coefficient multiplication unit 451 of the internal division process unit 45, the image D3 (a pixel value of each pixel thereof) is multiplied by the coefficient (1−α), and the multiplied image D3 is output to the adder 453.

In the second coefficient multiplication unit 452 of the internal division process unit 45, the image D31 (a pixel value of each pixel thereof) is multiplied by the coefficient α, and the multiplied image D31 is output to the adder 453.

In the adder 453, the output from the first coefficient multiplication unit 451 and the output from the second coefficient multiplication unit 452 are added, and the added image (image signal) is output as the image D4 (image signal D4).

In other words, in the image quality adjustment unit 4A, the process equivalent to $$D4=D3$$

is performed in the case of
(1) gate=0 and α=0,
and the process equivalent to $$D4=(1-\alpha)\times D3+\alpha\times D31$$

is performed in the case of
(2) gate=1, and $$\alpha=M\_ctl (0 \leq M\_ctl \leq 1).$$

The image D4 (image signal D4) generated in this manner is output from the image quality adjustment unit 4A to the second composition unit 32 of the composition unit 3.

In the second composition unit 32 of the composition unit 3, the composite image D3 output from the first composition unit 31 and the image quality adjustment the image D4 output from the image quality adjustment unit 4 (or the image quality adjustment unit 4A) are composited. Specifically, in the second composition unit 32, the composition process is performed so that the area AR3 (right image area of the image divided into three as illustrated in FIG. 5) of the composite image D3 illustrated in FIG. 5 is replaced with the area AR3 (right image area of the image divided into three as illustrated in FIG. 5) of the image quality adjustment image D4 illustrated in FIG. 5. The second composition unit 32 controls, based on, for example, a vertical synchronizing signal (VD signal), a horizontal synchronizing signal (HD signal), or an enable signal, to select and output the composite image signal D3 (composite image D3) in the area AR1 (left image area of the image divided into three as illustrated in FIG. 5) and the area AR2 (middle image area of the image divided into three as illustrated in FIG. 5), and select and output the image quality adjustment image signal D4 (image quality adjustment image D4) in the area AR3 (right image area of the image divided into three as illustrated in FIG. 5). The composition process can be performed accordingly. Alternatively, the second composition unit 32 may select and output, based on coordinate information on the area AR3 (for example, the lower left endpoint coordinates and the lower right endpoint coordinates of the area AR3), the composite image signal D3 (composite image D3) in the area AR1 and the area AR2, and select and output the image quality adjustment image signal D4 (image quality adjustment image D4) in the area AR3.

The image (image signal) composited by the second composition unit 32 in this manner is output from the second composition unit 32 as the output image Dout (output image signal Dout). Then, the image Dout output from the second composition unit 32 is displayed on, for example, a display unit (not illustrated).

As described above, in the image generation device 1000, it is possible to generate the image (video) in which (1) the image before the image quality adjustment, (2) the image indicating the mask area (image quality adjustment process target area), and (3) the image after the image quality adjustment are arranged on a screen, when the image is displayed on a display device. In other words, by viewing the image (video) generated by the image generation device 1000, a normal user who does not have technical knowledge can recognize that the image quality adjustment process is performed to which image area.

Figure 7:
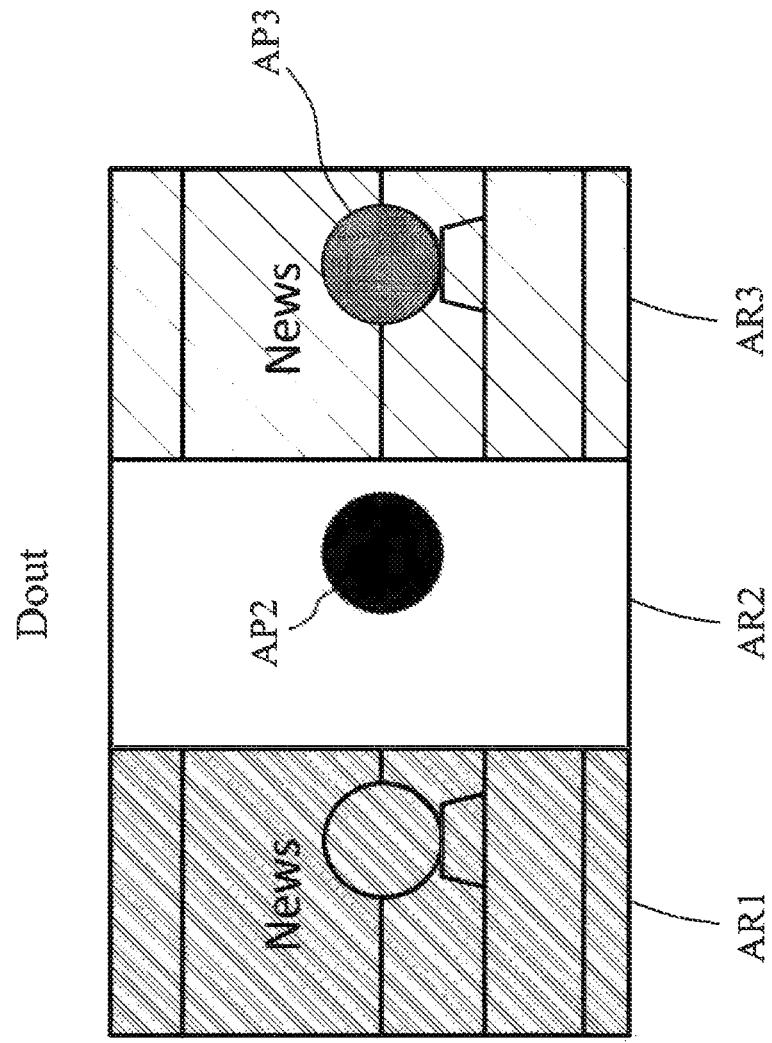
FIG. 7 is a diagram illustrating an example of a screen on which an output image Dout generated by the image generation device 1000 is displayed.

For example, as illustrated in FIG. 7, the output image Dout generated by the image generation device 1000 is displayed so that three of (1) the image before the image quality adjustment (the image of the area AR1), (2) the image indicating the mask area (image quality adjustment process target area) (the image of the area AR2), and (3) the image after the image quality adjustment (the image of the area AR3) are arranged on a screen.

Then, as illustrated in FIG. 7, since the area AP2 in the area AR2 indicates the area to which the image quality adjustment process has been performed, the area AP3 in the area AR3 is the image quality adjustment process target area, and the image quality adjustment process (the process by the image process unit 41) has been performed to the area. Consequently, by comparing the areas equivalent to the area AP2 in the areas AR1 and AR3, a normal user who does not have technical knowledge can easily recognize (confirm) the image quality adjustment effect.

As described above, in the image generation device 1000, it is possible to generate an image (video) in which images (videos) before and the image quality adjustment process and an image specifying the image quality adjustment process target area are composited. Consequently, by displaying the image (video) generated by the image generation device 1000 on a display device or the like, a normal user can easily recognize (confirm) the image quality improving effect.

Modified Example

Next, a modified example of the first embodiment will be described.

Figure 8:
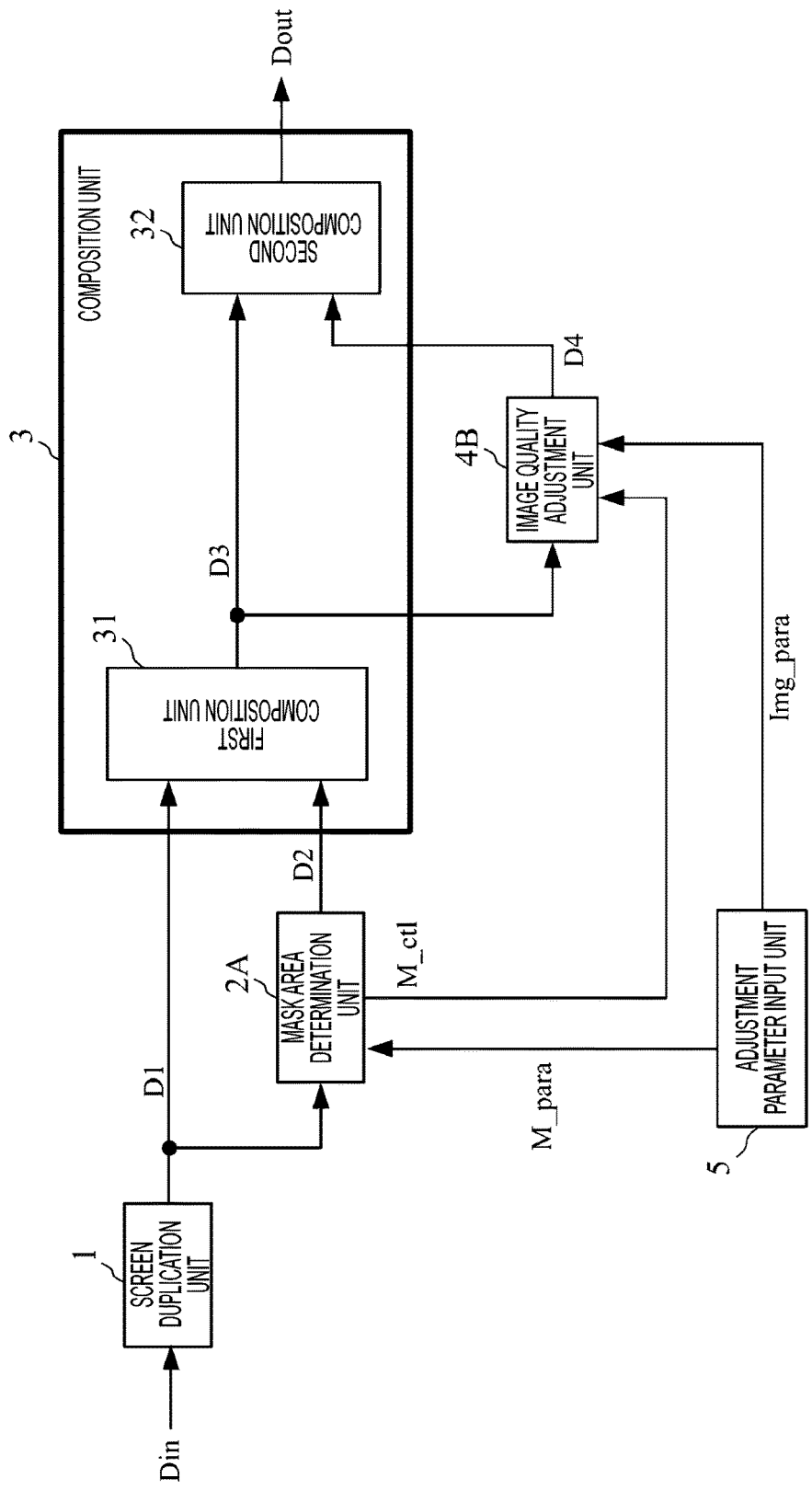
FIG. 8 is a block diagram schematically illustrating an image generation device 1000A of a modified example of the first embodiment.

FIG. 8 is a block diagram schematically illustrating an image generation device 1000A of the modified example.

Figure 9:
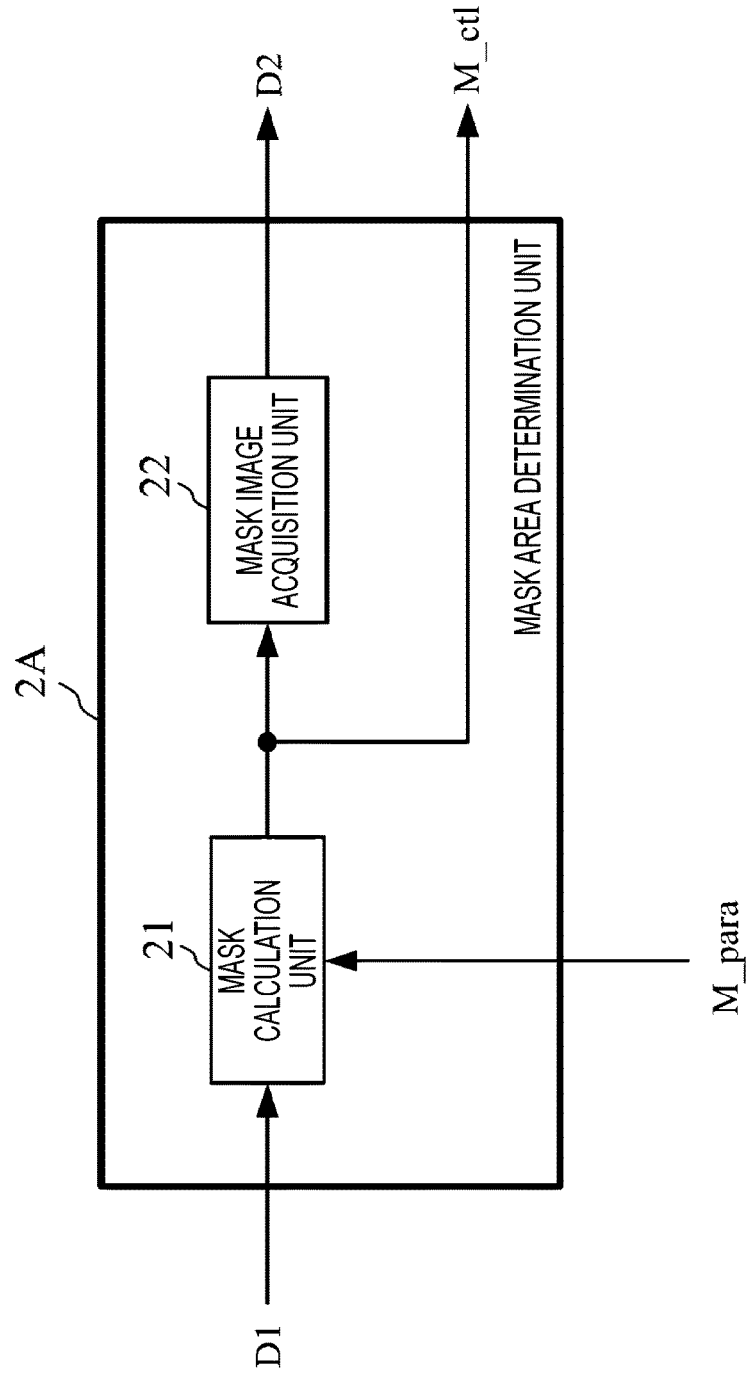
FIG. 9 is a block diagram schematically illustrating a mask area determination unit 2A of the image generation device 1000A of the modified example of the first embodiment.

FIG. 9 is a block diagram schematically illustrating a mask area determination unit 2A of the image generation device 1000A of the modified example.

Figure 10:
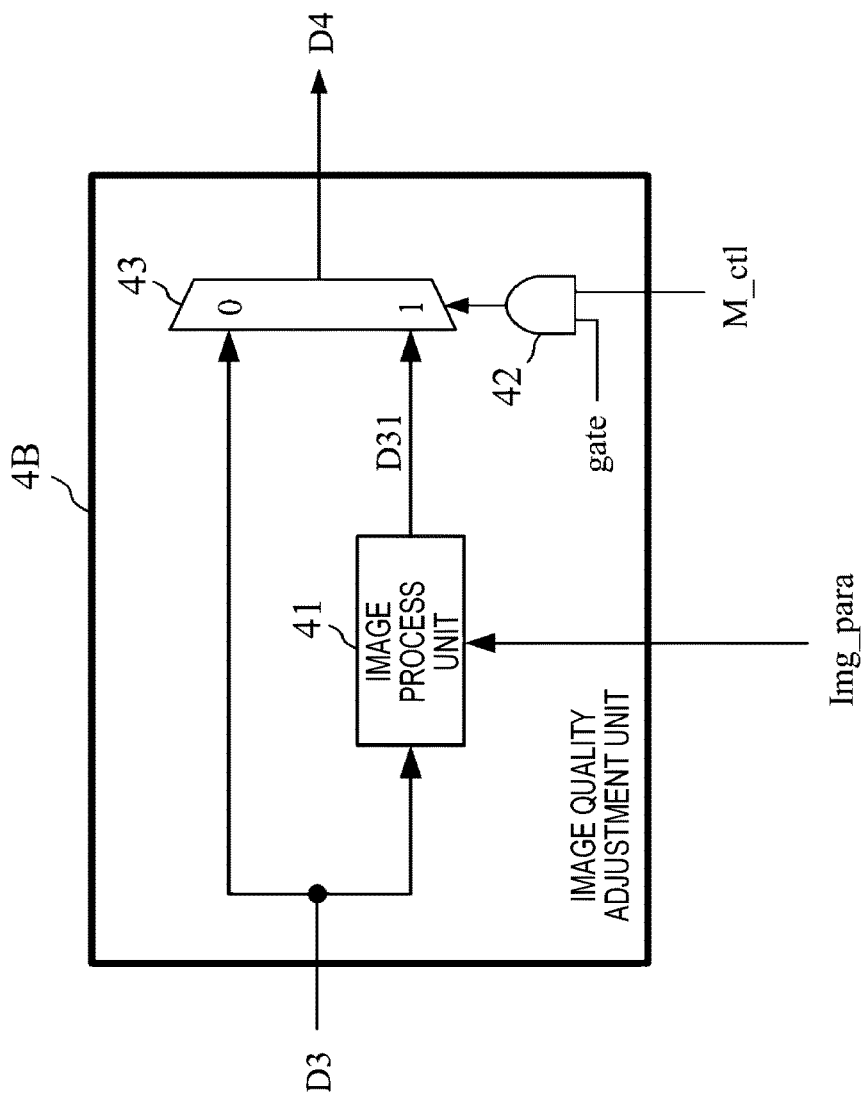
FIG. 10 is a block diagram schematically illustrating an image quality adjustment unit 4B of the image generation device 1000A of the modified example of the first embodiment.

FIG. 10 is a block diagram schematically illustrating an image quality adjustment unit 4B of the image generation device 1000A of the modified example.

Figure 11:
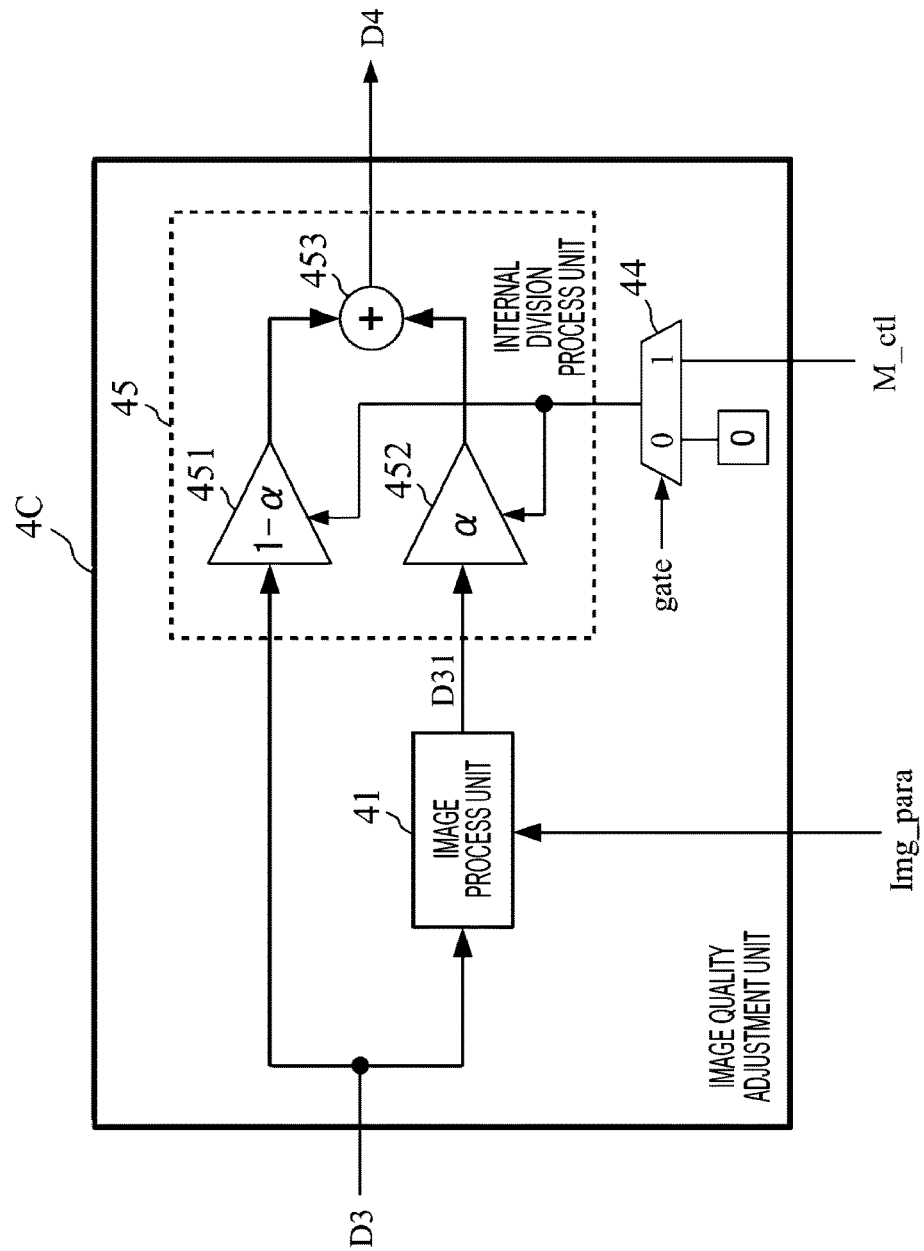
FIG. 11 is a block diagram schematically illustrating an image quality adjustment unit 4C of the image generation device 1000A of the modified example of the first embodiment.

FIG. 11 is a block diagram schematically illustrating an image quality adjustment unit 4C of the image generation device 1000A of the modified example.

As illustrated in FIG. 8, the image generation device 1000A of the modified example has a configuration in which an adjustment parameter input unit 5 is added to the image generation device 1000 of the first embodiment and the mask area determination unit 2 and the image quality adjustment unit 4 of the image generation device 1000 of the first embodiment are replaced with the mask area determination unit 2A and the image quality adjustment unit 4B respectively.

The other configuration of the image generation device 1000A of the modified example is similar to the image generation device 1000 of the first embodiment. In the modified example, the description similar to the first embodiment will be omitted.

The adjustment parameter input unit 5 is, for example, an interface capable of inputting a mask parameter M_para to adjust calculation accuracy to be set (determined) externally (for example, by a user) to an mask area (process target image) at the mask area determination unit 2A and a process intensity parameter Img_para to adjust image process intensity at the image quality adjustment unit 4B.

The adjustment parameter input unit 5 outputs information on the input mask parameter M_para to the mask calculation unit 21 of the mask area determination unit 2A.

As illustrated in FIG. 9, the mask calculation unit 21 of the mask area determination unit 2A receives the information on the mask parameter M_para output from the adjustment parameter input unit 5 and sets the accuracy for the mask calculation based on the mask parameter M_para. Then, the mask calculation unit 21 of the mask area determination unit 2A determines the mask area according to the calculation accuracy set based on the mask parameter M_para and outputs a signal (mask area instruction signal) M_ctl indicating the determined mask area to the mask image acquisition unit 22 and the image quality adjustment unit 4B.

In other words, the mask calculation unit 21 determines the mask area according to the calculation accuracy based on the mask parameter M_para, and it is possible to adjust the likelihood to determine the mask area (process target area) accordingly.

As illustrated in FIG. 10, the image process unit 41 of the image quality adjustment unit 4B receives the information on the process intensity parameter Img_para output from the adjustment parameter input unit 5 and sets, based on the process intensity parameter Img_para, the process intensity of the image process to be performed by the image process unit 41. Then, the image process unit 41 of the image quality adjustment unit 4B performs the image process to the composite image D3 with the process intensity set based on the process intensity parameter Img_para and outputs the image processed image (image signal) to the selector 43 as an image D31 (image signal D31).

In other words, in the image process unit 41, it is possible to perform the image process with the process intensity based on the process intensity parameter Img_para.

Furthermore, the image quality adjustment unit 4B may be replaced with the image quality adjustment unit 4C illustrated in FIG. 11 similarly to the first embodiment.

In the image quality adjustment unit 4C, the information on the process intensity parameter Img_para is input to the image process unit 41 similarly to the image quality adjustment unit 4B. Then, the image process unit 41 of the image quality adjustment unit 4C performs the image process to the composite image D3 with the process intensity set based on the process intensity parameter Img_para and outputs the image processed image (image signal) to the internal division process unit 45 as the image D31 (image signal D31).

FIGS. 12(a) and (b) are diagrams each illustrating an example of a setting state of an adjustment parameter and an image (output image Dout) generated by the image generation device 1000A of the modified example.

Figure 12:
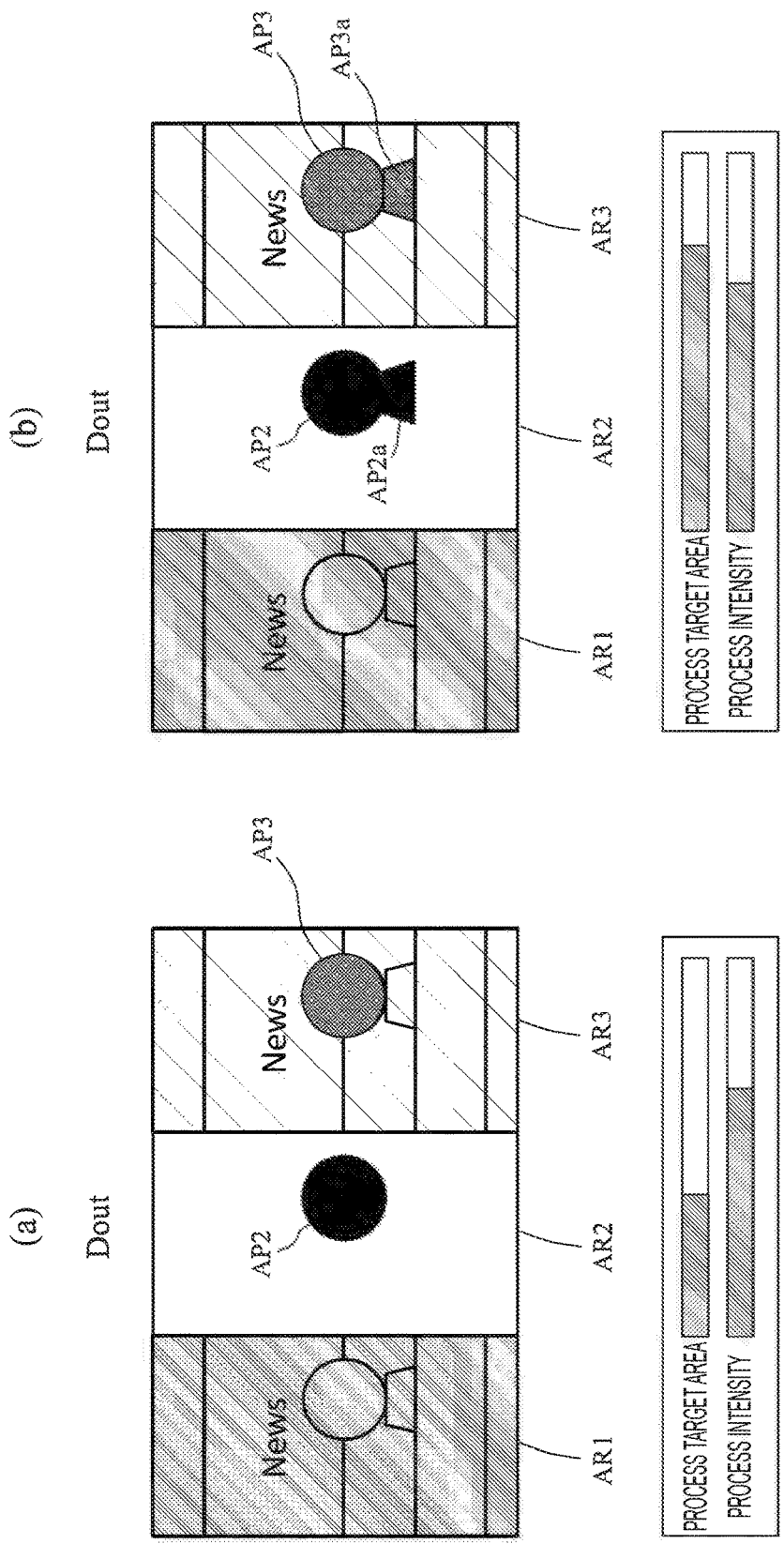
FIGS. 12(a) and (b) are diagrams each illustrating examples of an image (output image Dout) generated by the image generation device 1000A of the modified example of the first embodiment and a setting state of an adjustment parameter.

The lower diagrams of FIGS. 12 (a) and (b) each schematically illustrate a parameter to determine the process target area and a parameter of the process intensity. The parameter to determine the process target area corresponds to the mask parameter M_para, and the parameter of the process intensity corresponds to the process intensity parameter Img_para.

The process intensity is same (the values of the process intensity parameters Img_para are same) in FIGS. 12(a) and 12(b), and the set value of the parameter to determine the process target area in FIG. 12 (a) is larger than that in FIG. 12 (b) (the value is more likely to be set to the process target area).

The process target area (mask area) in FIG. 12(a) is the image area equivalent to the area AP2 and the process target area (mask area) in FIG. 12 (b) is the image area equivalent to the area AP2 and the area AP2a, which shows that the larger area is set to the process target area in FIG. 12(b) than the area in FIG. 12(a).

In other words, it is easily recognized that the image quality adjustment process has been performed to the area AP3 in the area AR3 in FIG. 12 (a) and the image quality adjustment process has been performed to the areas AP3 and AP3a in the area AR3 in FIG. 12(b).

Consequently, by paying attention to the area and comparing the image before the image quality adjustment (the image displayed in the area AR1) with the image after the image quality adjustment (the image displayed in the area AR3), it is possible to easily recognize the image quality adjustment effect.

Furthermore, by changing the values of the mask parameter M_para and the process intensity parameter Img_para in the adjustment parameter input unit 5, it is possible to easily recognize the changes in the process target area and in the image quality adjustment effect according to the change of the parameter.

The images indicating the adjustment states of the parameters illustrated in the lower side of FIGS. 12(a) and (b) may be composited or superimposed on the output image Dout and displayed on a display screen.

Second Embodiment

Next, a second embodiment will be described.

Hereinafter, particular points to the present embodiment will be described. The same reference signs are assigned to the points similar to the above embodiment and the detailed description thereof will be omitted.

Figure 13:
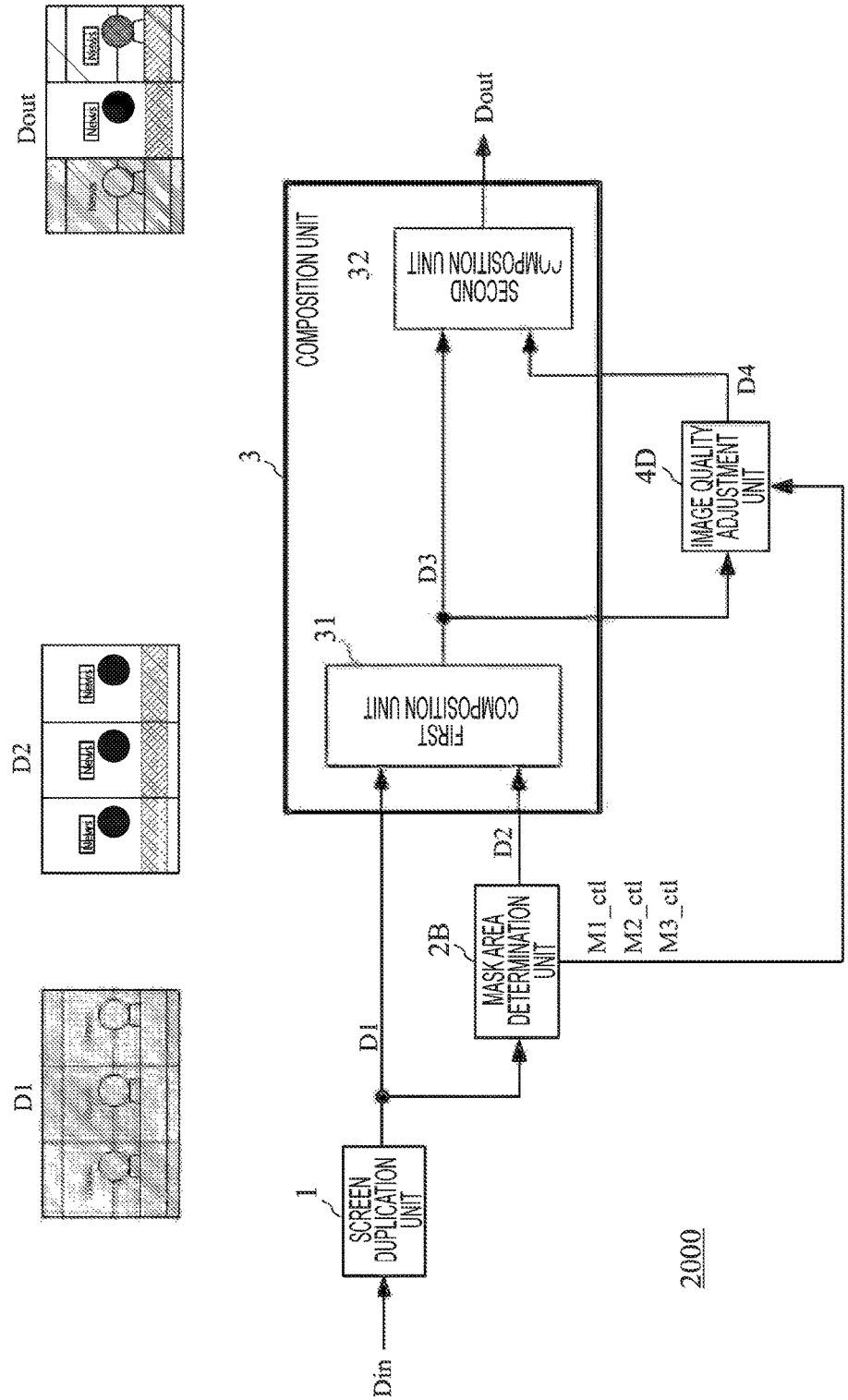
FIG. 13 is a block diagram schematically illustrating an image generation device 2000 according to a second embodiment.

FIG. 13 is a block diagram schematically illustrating an image generation device 2000 according to the second embodiment.

As illustrated in FIG. 13, the image generation device 2000 has a configuration in which the mask area determination unit 2 and the image quality adjustment unit 4 of the image generation device 1000 of the first embodiment are replaced with a mask area determination unit 2B and an image quality adjustment unit 4D respectively.

The other configuration of the image generation device 2000 of the present embodiment is similar to the image generation device 1000 of the first embodiment.

Figure 14:
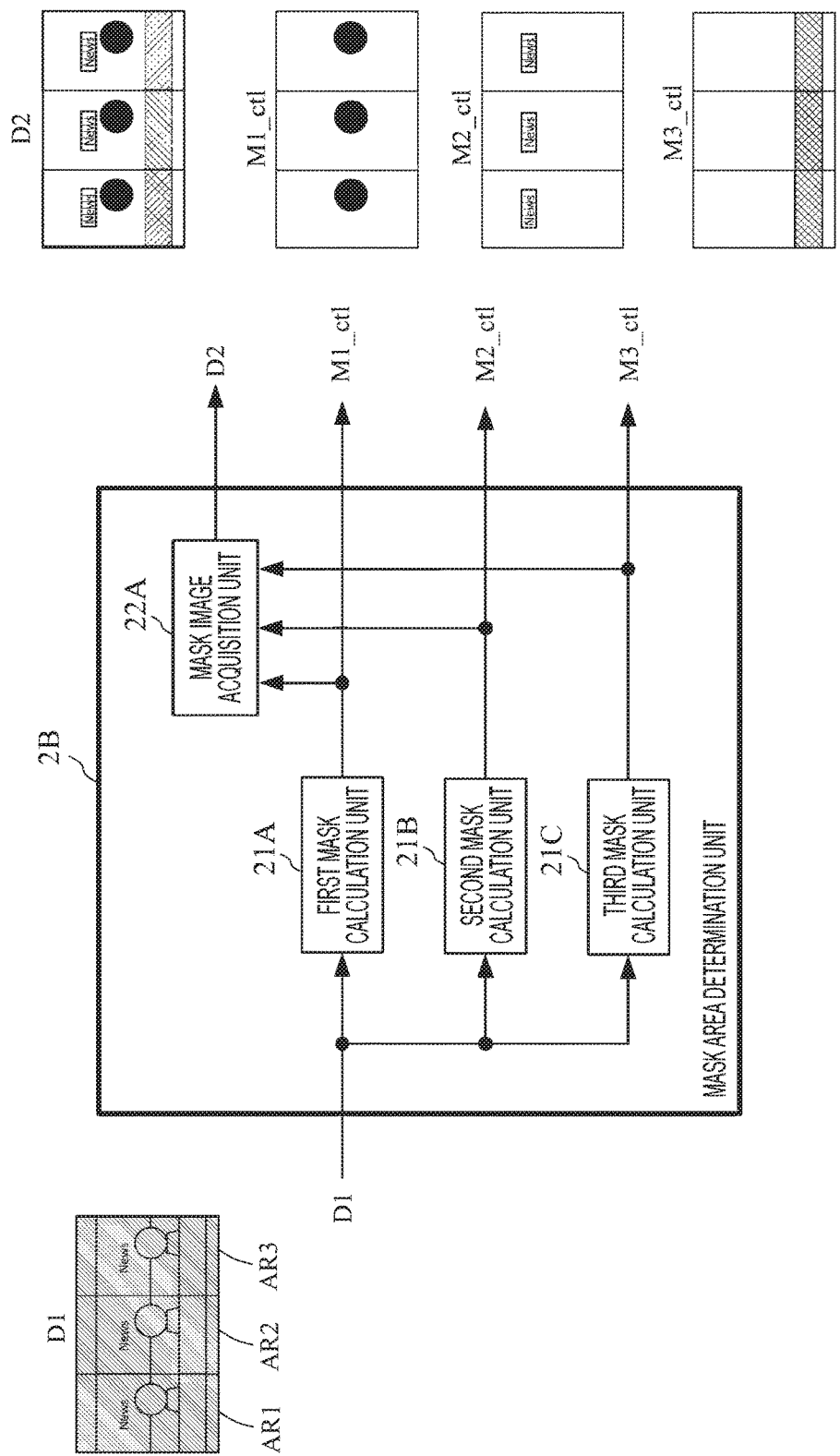
FIG. 14 is a block diagram schematically illustrating of a mask area determination unit 2B.

FIG. 14 is a block diagram schematically illustrating the mask area determination unit 2B.

As illustrated in FIG. 14, the mask area determination unit 2B includes a first mask calculation unit 21A, a second mask calculation unit 21B, a third mask calculation unit 21C, and a mask image acquisition unit 22A.

The first mask calculation unit 21A receives a composite duplicate image D1 output from a screen duplication unit 1 and determines, based on the received composite duplicate image D1, a first mask area (for example, a human face image area). Then, the first mask calculation unit 21A outputs a signal indicating the determined first mask area (first mask area instruction signal) M_ctl to the mask image acquisition unit 22A and the image quality adjustment unit 4D.

The second mask calculation unit 21B receives the composite duplicate image D1 output from the screen duplication unit 1 and determines, based on the received composite duplicate image D1, a second mask area (for example, a character image area). Then, the second mask calculation unit 21B outputs a signal indicating the determined second mask area (second mask area instruction signal) M2_ctl to the mask image acquisition unit 22A and the image quality adjustment unit 4D.

The third mask calculation unit 21C receives the composite duplicate image D1 output from the screen duplication unit 1 and determines, based on the received composite duplicate image D1, a third mask area (for example, a flat image area having a certain color). Then, the third mask calculation unit 21C outputs a signal indicating the determined third mask area (third mask area instruction signal) M3_ctl to the mask image acquisition unit 22A and the image quality adjustment unit 4D.

The mask image acquisition unit 22A receives the first mask area instruction signal M1_ctl output from the first mask calculation unit 21A, the second mask area instruction signal M2_ctl output from the second mask calculation unit 21B, and the third mask area instruction signal M3_ctl output from the third mask calculation unit 21C. The mask image acquisition unit 22A generates, based on the received first to third mask area instruction signals M1_ctl to M3_ctl, an image (mask image) D2 specifying each mask area.

for example, the mask image acquisition unit 22A generates the image (mask images) D2 specifying each mask area by displaying (1) the pixel included in the image area (for example, the circular area illustrated in FIG. 14) where the signal value of the first mask area instruction signal M1_ctl is Mt (=1) in red, (2) the pixel included in the image area (for example, the rectangular area, in which characters are displayed, illustrated in FIG. 14) where the signal value of the second mask area instruction signal M2_ctl is Mt (=1) in green, and (3) the pixel included in the image area (for example, the lower rectangular area illustrated in FIG. 14) where the signal value of the third mask area instruction signal M3_ctl is Mt (=1) in blue.

Then, the mask image acquisition unit 22A outputs the generated mask image D2 to a composition unit 3.

Figure 15:
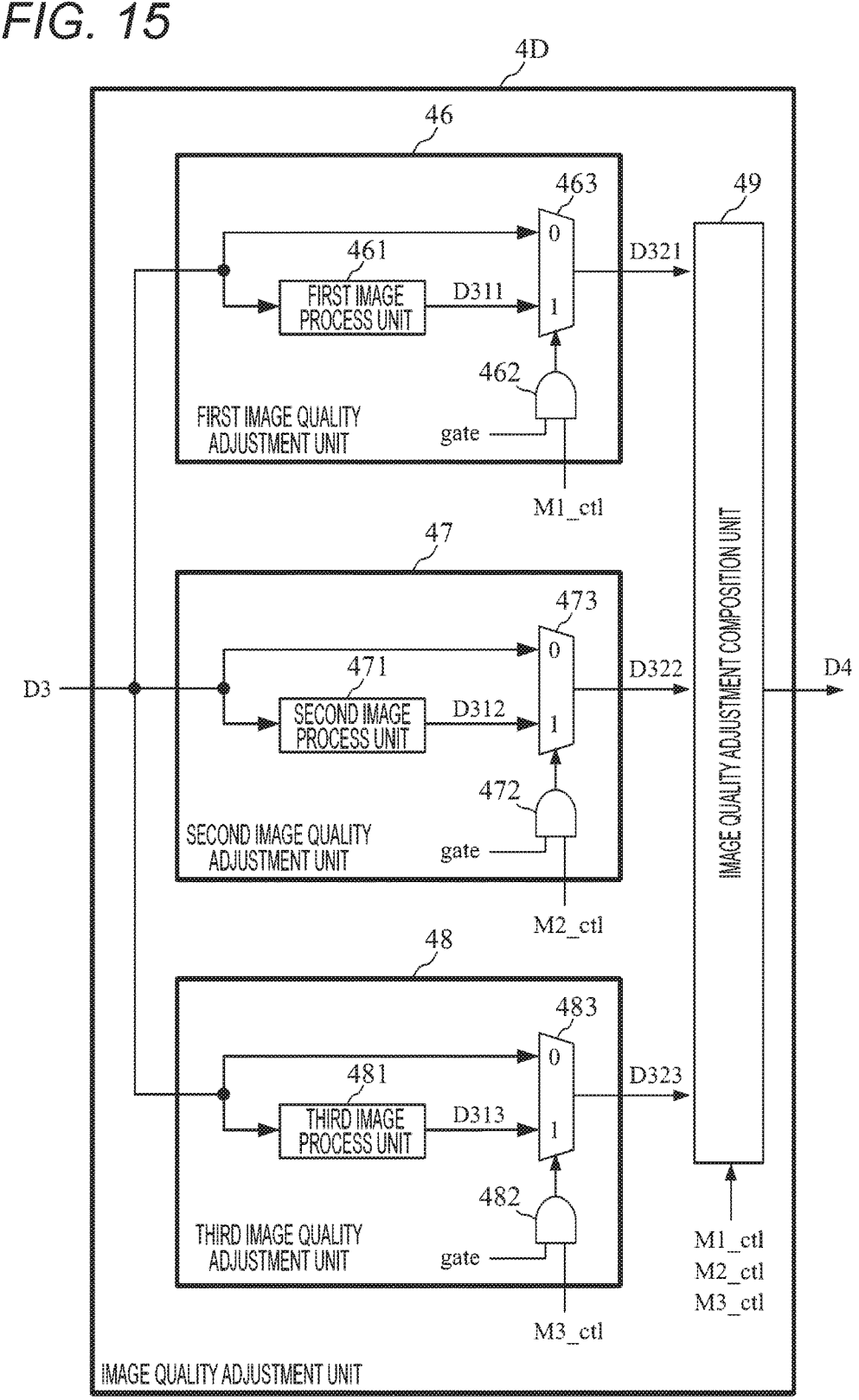
FIG. 15 is a block diagram schematically illustrating an image quality adjustment unit 4D.

FIG. 15 is a block diagram schematically illustrating the image quality adjustment unit 4D.

As illustrated in FIG. 15, the image quality adjustment unit 4D includes a first image quality adjustment unit 46, a second image quality adjustment unit 47, a third image quality adjustment unit 48, and an image quality adjustment composition unit 49.

The first image quality adjustment unit 46 has a configuration similar to the image quality adjustment unit 4 of the first embodiment and includes a first image process unit 461, a gate unit 462, and a selector 463 as illustrated in FIG. 15.

The first image process unit 461 receives the composite image D3 output from the first composition unit 31 and performs a first image process (for example, a noise reduction process to skin color parts) to the received composite image D3. Then, the first image process unit 461 outputs the image (image signal), to which the first image process has been performed, to the selector 463 as an image D311 (image signal D311).

The selector 463 selects and outputs, similarly to the selector 43 of the image quality adjustment unit 4 of the first embodiment, (1) the image D311 (image signal D311) to the image quality adjustment composition unit 49 when the gate signal is active (for example, "1") and the signal value of the first mask area instruction signal M1_ctl is "1", and (2) the composite image D3 (composite image signal D3) to the image quality adjustment composition unit 49 in the cases other than the above (1) case.

The image (image signal) output from the first image quality adjustment unit 46 to the image quality adjustment composition unit 49 is an image D321 (image signal D321).

The second image quality adjustment unit 47 has a configuration similar to the image quality adjustment unit 4 of the first embodiment and includes a second image process unit 471, a gate unit 472, and a selector 473 as illustrated in FIG. 15.

The second image process unit 471 receives the composite image D3 output from the first composition unit 31 and performs a second image process (for example, an emphasis process to characters) to the received composite image D3. Then, the second image process unit 471 outputs the image (image signal), to which the second image process has been performed, to the selector 473 as an image D312 (image signal D312).

The selector 473 selects and outputs, similarly to the selector 43 of the image quality adjustment unit 4 of the first embodiment,
(1) the image D312 (image signal D312) to the image quality adjustment composition unit 49 when the gate signal is active (for example, "1") and the signal value of the second mask area instruction signal M2_ctl is "1", and
(2) the composite image D3 (composite image signal D3) to the image quality adjustment composition unit 49 in the cases other than the above (1) case.

The image (image signal) output from the second image quality adjustment unit 47 to the image quality adjustment composition unit 49 is an image D322 (image signal D322).

The third image quality adjustment unit 48 has a configuration similar to the image quality adjustment unit 4 of the first embodiment and includes a third image process unit 481, a gate unit 482, and a selector 483 as illustrated in FIG. 15.

The third image process unit 481 receives the composite image D3 output from the first composition unit 31 and performs a third image process (for example, a detail enhancer process to a flat image area having a certain color) to the received composite image D3. Then, the third image process unit 481 outputs the image (image signal), to which the third image process has been performed, to the selector 483 as an image D313 (image signal D313).

The selector 483 selects and outputs, similarly to the selector 43 of the image quality adjustment unit 4 of the first embodiment,
(1) the image D313 (image signal D313) to the image quality adjustment composition unit 49 when the gate signal is active (for example, "1") and the signal value of the third mask area instruction signal M3_ctl "1", and
(2) the composite image D3 (composite image signal D3) to the image quality adjustment composition unit 49 in the cases other than the above (1) case.

The image (image signal) output from the third image quality adjustment unit 48 to the image quality adjustment composition unit 49 is an image D323 (image signal D323).

The image quality adjustment composition unit 49 receives the image D321 output from the first image quality adjustment unit 46, the image D322 output from the second image quality adjustment unit 47, the image D323 output from the third image quality adjustment unit 48, the first mask area instruction signal M1_ctl output from the first mask calculation unit 21A, the second mask area instruction signal M2_ctl output from the second mask calculation unit 21B, and the third mask area instruction signal M3_ctl output from the third mask calculation unit 21C.

Then, the image quality adjustment composition unit 49 selects
(1) the image D321 output from the first image quality adjustment unit 46 in the area where the value of the first mask area instruction signal M1_ctl is Mt (=1),
(2) the image D322 output from the second image quality adjustment unit 47 in the area where the value of the second mask area instruction signal M2_ctl is Mt (=1),
(3) the image D323 output from the third image quality adjustment unit 48 in the area where the value of the third mask area instruction signal M3_ctl is Mt (=1), and
(4) the composite image D3 in the cases other than the above (1) to (3) cases, and outputs the selected image to the second composition unit 32 of the composition unit 3 as an image D4 (image signal D4).

Note that, when the signal corresponds to two or more of the above (1) to (3) cases, an image composited by an internal division process or an average process may be output.

The above description is based on the assumption that the first mask area instruction signal M1_ctl, the second mask area instruction signal M2_ctl, and the third mask area instruction signal M3_ctl are a binary signal (signal indicating "0" or "1"). When the first mask area instruction signal M1_ctl, the second mask area instruction signal M2_ctl, and the third mask area instruction signal M3_ctl is a signal indicating an intermediate value of 0 to 1 similarly to the first embodiment, the image quality adjustment unit 4D may have the following configuration.

In other words, the image quality adjustment unit 4D may include the first image quality adjustment unit 46, the second image quality adjustment unit 47, and the third image quality adjustment unit 48 which each have a similar configuration to that of the image quality adjustment unit 4A of the first embodiment.

Figure 16:
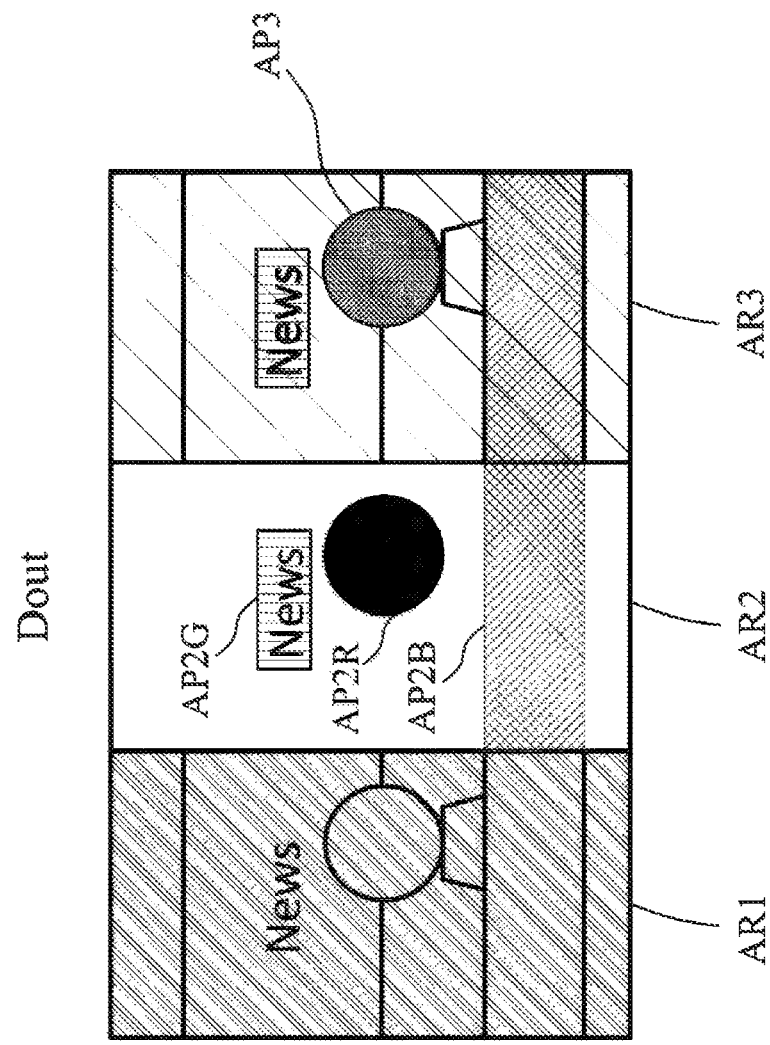
FIG. 16 is a diagram schematically illustrating an example of an image (output image Dout) generated by the image generation device 2000 according to the second embodiment.

FIG. 16 is a diagram schematically illustrating an example of an image (output image Dout) generated by the image generation device 2000 according to the second embodiment.

In FIG. 16, (1) the area set to the mask area by the first mask area instruction signal M1_ctl is the area AR2R, (2) the area set to the mask area by the second mask area instruction signal M2_ctl is the area AR2G, and (3) the area set to the mask area by the third mask area instruction signal M3_ctl is the area AR2B.

As illustrated in FIG. 16, the output image Dout generated by the image generation device 2000 is displayed so that three of (1) the image before the image quality adjustment (the image of the area AR1), (2) the image indicating a plurality of (in the present embodiment, three of) mask areas (image quality adjustment process target area) (the image of the area AR2), and (3) the image after the image quality adjustment (the image of the area AR3) are arranged on a screen.

Then, as illustrated in FIG. 16,
(1) the area AP2R in the area AR2 (the area displayed in red) indicates the area to which the image quality adjustment process has been performed by the first image process (for example, a noise reduction process to skin color parts,
(2) the area AP2G in the area AR2 (the area displayed in green) indicates the area to which the image quality adjustment process has been performed by the second image process (for example, an emphasis process to characters), and (3) the area AP2B in the area AR2 (the area displayed in blue) indicates the area to which the image quality adjustment process has been performed by the third image process (for example, a detail enhancer process to a flat image area having a certain color).

As described above, in the output image Dout generated by the image generation device 2000, it is possible to easily recognize that three different image processes have been performed to which areas with the image displayed in the area AP2G. Then, by comparing the areas equivalent to the area AP2 in the areas AR1 and AR3, a normal user who does not have technical knowledge can easily recognize (confirm) the image quality adjustment effect.

As described above, in the image generation device 2000, it is possible to generate an image (video) in which images (video) before and after the image quality adjustment process and an image specifying (for example, by using different colors) the image quality adjustment process target areas are composited. Consequently, by displaying an image (video) generated by the image generation device 2000 on a display device or the like, a normal user can easily recognize (confirm) the image quality improving effect.

Furthermore, the image generation device 2000 of the present embodiment may add the adjustment parameter input unit 5 and adjust, according to the mask parameter M_para and the process intensity parameter Img_para, the process target area (mask area) and the image quality (the process intensity of the image process) similarly to that of the modified example of the first embodiment.

For example, the image generation device 2000 may set
(1) the mask parameter to be input to the first mask calculation unit 21A of the mask area determination unit 2B to the first mask parameter M1_para, and the process intensity parameter to be input to the first image process unit 461 of the image quality adjustment unit 4D to the first process intensity parameter Img1_para,
(2) the mask parameter to be input to the second mask calculation unit 21B of the mask area determination unit 2B to the second mask parameter M2_para, and the process intensity parameter to be input to the second image process unit 471 of the image quality adjustment unit 4D to the second process intensity parameter Img2_para, and
(3) the mask parameter to be input to the third mask calculation unit 21C of the mask area determination unit 2B to the third mask parameter M3_para, and the process intensity parameter to be input to the third image process unit 481 of the image quality adjustment unit 4D to the third process intensity parameter Img3_para, and adjust the process target area (mask area) and the image quality (the process intensity of the image process) based on the mask parameter and the process intensity parameter similarly to the modified example of the first embodiment.

FIGS. 17(a) and (b) are diagrams each illustrating examples of a generated image (output image Dout) and a setting state of an adjustment parameter in the image generation device 2000 in which the process target area (mask area) and the image quality (process intensity of the image process) are adjusted based on the mask parameter and the process intensity parameter.

The lower diagrams in FIGS. 17(a) and (b) each schematically illustrate a parameter to determine the process target area and a parameter of the process intensity. Specifically,
(1) the diagram indicated as a parameter PaR corresponds to the first mask parameter M1_para to be input to the first mask calculation unit 21A and the first process intensity parameter Img1_para to be input to the first image process unit 461,
(2) the diagram indicated as a parameter PaG corresponds to the second mask parameter M2_para to be input to the second mask calculation unit 21B and the second process intensity parameter Img2_para to be input to the second image process unit 471, and
(3) the diagram indicated as a parameter PaB corresponds to the third mask parameter M3_para to be input to the third mask calculation unit 21C and the third process intensity parameter Img3_para to be input to the third image process unit 481.

Figure 17:
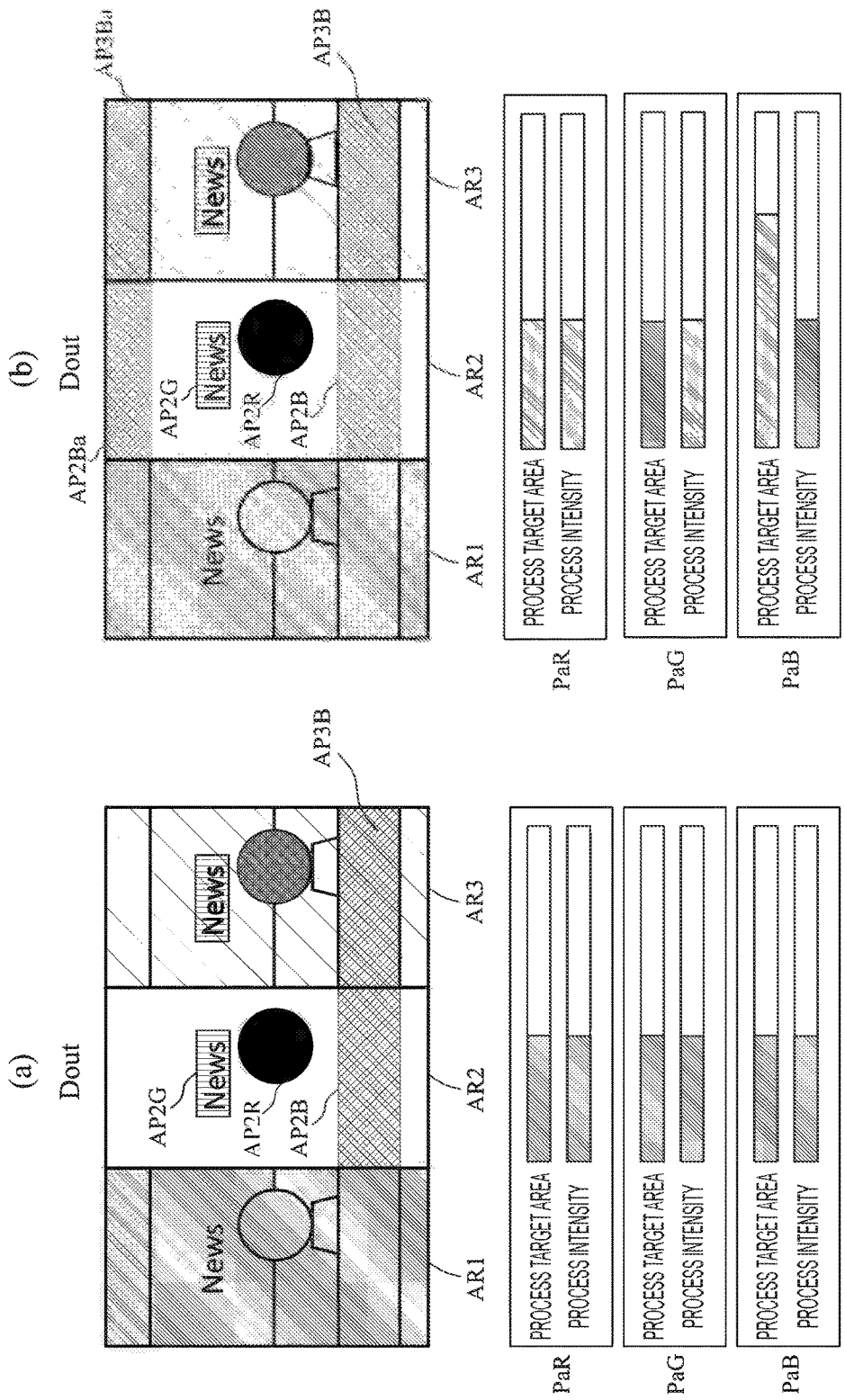
FIGS. 17(a) and 17(b) are diagrams each illustrating an example of a setting state of a generated image (output image Dout) and an adjustment parameter in the case where the image generation device 2000 is configured to adjust a process target area (mask area) and an image quality (process intensity of an image process) based on the mask parameter and the process intensity parameter.

In FIG. 17, a plurality of (in the present embodiment, three of) mask areas (the image quality adjustment process target areas) are specified in the image displayed in the area AR2. In other words,
(1) the area AP2R in the area AR2 (the area displayed in red) indicates the area to which the image quality adjustment process has been performed by the first image process (for example, noise reduction process to skin color parts),
(2) the area AP2G in the area AR2 (the area displayed in green) indicates the area to which the image quality adjustment process has been performed by the second image process (for example, emphasis process to characters), and
(3) the area AP2B in the area AR2 (the area displayed in blue) indicates the area to which the image quality adjustment process has been performed by the third image process (for example, detail enhancer process to a flat image area having a certain color).

When the state of FIG. 17(a) is changed to the state of FIG. 17(b) where only the degree of the process target area of the parameter PaB is changed, in other words, when only the third mask parameter M3_para to be input to the third mask calculation unit 21C is changed, it is possible to easily confirm that the third image process (for example, detail enhancer process to a flat image area having a certain color) target area (mask area) is expanded and the upper part of the screen becomes the third image process target area as illustrated in the area AR2 of FIG. 17(b).

In other words, in the image Dout generated by the image generation device of the present embodiment, the image quality adjustment effect in the case of FIG. 17(a) can be confirmed as follows:

(A1) since the first image process (for example, a noise reduction process to skin color parts) has been performed to the area corresponding to the area AP2R in the area AR2 (the area displayed in red), by comparing the area corresponding to the area AP2R in the image before the image quality adjustment (the image in the area AR1) with that in the image after the image quality adjustment (the image in the area AR3), it is possible to easily recognize the image quality adjustment effect.

(A2) since the second image process (for example, an emphasis process to characters) has been performed to the area corresponding to the area AP2G in the area AR2 (the area displayed in green), by comparing the area corresponding to the area AP2G in the image before the image quality adjustment (the image in the area AR1) with that in the image after the image quality adjustment (the image in the area AR3), it is possible to easily recognize the image quality adjustment effect.

(A3) since the third image process (for example, a detail enhancer process to a flat image area having a certain color) has been performed to the area corresponding to the area AP2B in the area AR2 (the area displayed in blue), by comparing the area corresponding to the area AP2B in the image before the image quality adjustment (the image in the area AR1) with that in the image after the image quality adjustment (the image in the area AR3), it is possible to easily recognize the image quality adjustment effect.

Furthermore, in the image Dout generated by the image generation device of the present embodiment, the image quality adjustment effect in the case of FIG. 17(b) can be confirmed as follows:

(B1) since the first image process (for example, a noise reduction process to skin color parts) has been performed to the area corresponding to the area AP2R in the area AR2 (the area displayed in red), by comparing the area corresponding to the area AP2R in the image before the image quality adjustment (the image in the area AR1) with that in the image after the image quality adjustment (the image in the area AR3), it is possible to easily recognize the image quality adjustment effect.

(B2) since the second image process (for example, an emphasis process to characters) has been performed to the area corresponding to the area AP2G in the area AR2 (the area displayed in green), by comparing the area corresponding to the area AP2G in the image before the image quality adjustment (the image in the area AR1) with that in the image after the image quality adjustment (the image in the area AR3), it is possible to easily recognize the image quality adjustment effect.

(B3) since the third image process (for example, a detail enhancer process to a flat image area having a certain color) has been performed to the area corresponding to the areas AP2B and AP2Ba in the area AR2 (the area displayed in blue), by comparing the areas corresponding to the area AP2B and AP2Ba in the image before the image quality adjustment (the image in the area AR1) with that in the image after the image quality adjustment (the image in the area AR3), it is possible to easily recognize the image quality adjustment effect.

As described above, in the image generation device of the present embodiment, it is possible to generate an image in which the images before and after the image quality adjustment process and the image specifying the mask area for each image process are composited in the case where the image quality is adjusted by performing a plurality of image processes. Then, in the case where the image generated in which manner is displayed on a display device, the images before and after the image quality adjustment process and the image specifying the mask area for each image process are arranged and displayed on a screen, and a normal user can easily grasp the process target area (mask area) and the process intensity of each image process. In other words, by comparing the images before and after the image quality adjustment process based on the image specifying the mask area for each image process, a normal user can appropriately grasp the process target area (mask area) and the process intensity of each image process and easily appropriately recognize the image quality adjustment effect accordingly.

It has been described that the mask area determination unit has three mask calculation units and the image quality adjustment unit 4D has three image quality adjustment units. The image generation device is not limited to the above and may have more mask calculation units and image quality adjustment units.

Third Embodiment

Next, a third embodiment will be described.
<3.1: Configuration of Image Generation Device>
FIG. 18 is a block diagram schematically illustrating an image generation device 3000 of the third embodiment.

Figure 18:
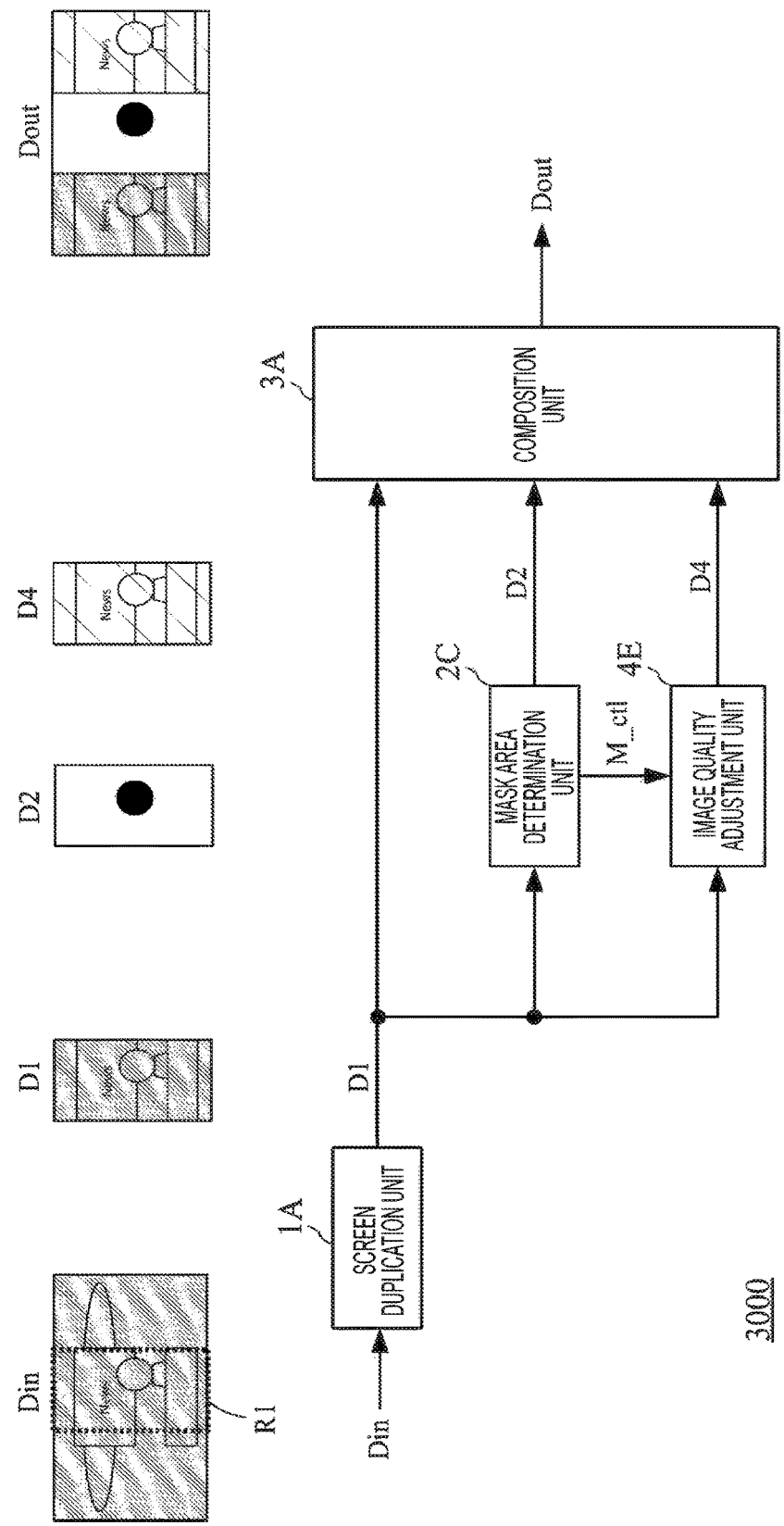
FIG. 18 is a block diagram schematically illustrating an image generation device 3000 of a third embodiment.

As illustrated in FIG. 18, the image generation device 3000 of the present embodiment includes a screen duplication unit 1A, a mask area determination unit 2C, a composition unit 3A, and an image quality adjustment unit 4E.

The screen duplication unit 1A extracts a predetermined image area (for example, an area R1 illustrated in FIG. 18) from an input image Din and outputs the image of the extracted image area to the mask area determination unit 2C, the image quality adjustment unit 4E, and the composition unit 3A as an image D1 (image signal D1).

The mask area determination unit 2C receives the image D1 output from the screen duplication unit 1A and generates, from the received image D1, an image specifying a mask area (mask image) D2. Then, the mask area determination unit 2C outputs the generated mask image D2 to the composition unit 3A. Furthermore, the mask area determination unit 2C generates a mask area instruction signal M_ctl indicating the mask area and outputs the generated mask area instruction signal M_ctl to the image quality adjustment unit 4E.

The image quality adjustment unit 4E receives the mask area instruction signal M_ctl output from the mask area determination unit 2C and the image D1 output from the screen duplication unit 1A. The image quality adjustment unit 4E performs a predetermined image process to the mask area, which is indicated by the mask area instruction signal M_ctl, of the image D1. Then, the image quality adjustment unit 4E outputs the image to which the image process has been performed D4 to the composition unit 3A.

The composition unit 3A receives the image D1 output from the screen duplication unit 1A, the mask image D2 output from the mask area determination unit 2C, and the image processed image D4 output from the image quality adjustment unit 4E. Then, the composition unit 3A composites the images D1, D2, and D3, and outputs the composite image as an image Dout.

Figure 19:
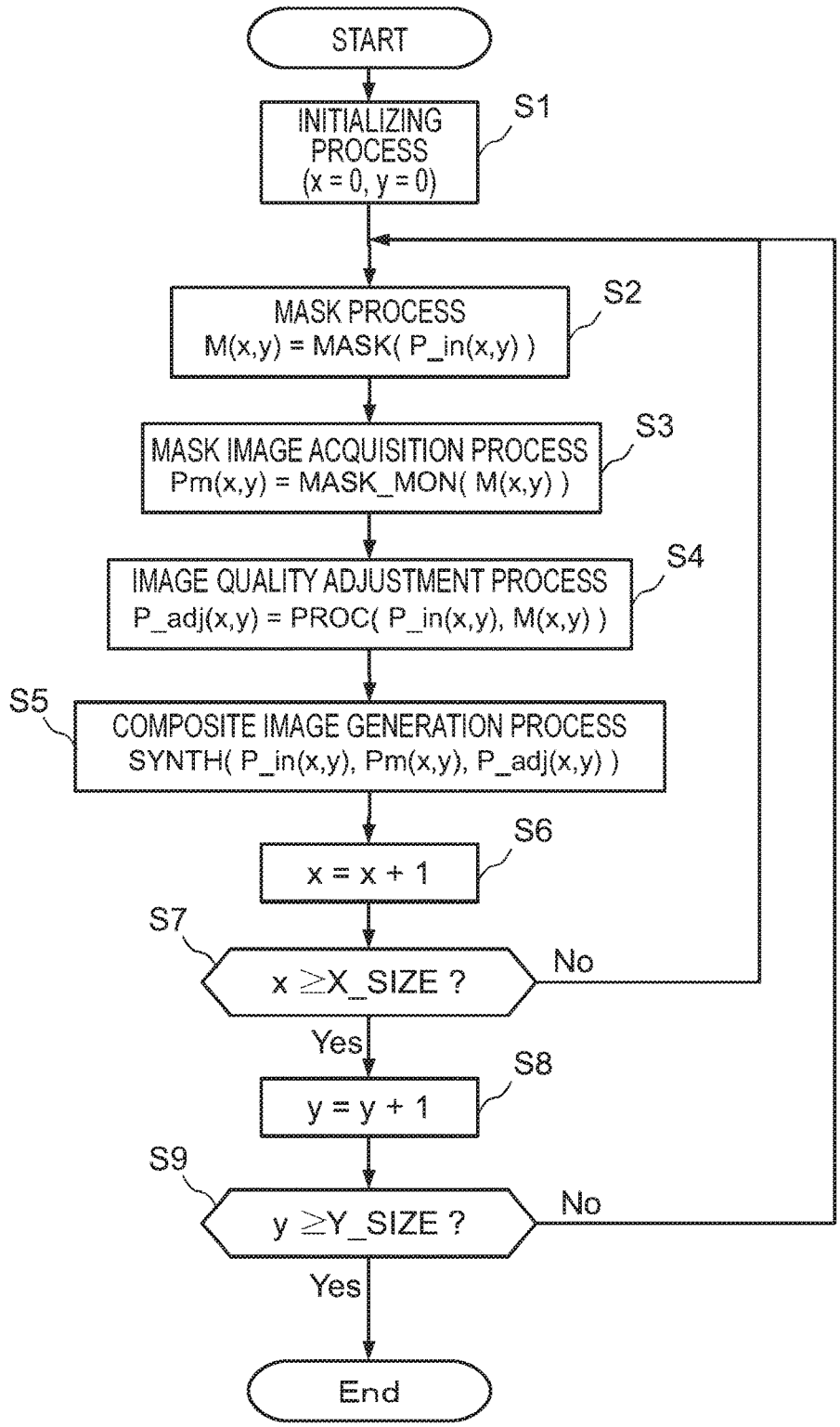
FIG. 19 is a process flowchart of the image generation device 3000 according to the third embodiment.

<3.2: Operation of Image Generation Device>
Hereinafter, the operation of the image generation device 3000 having the above configuration will be described with reference to the process flowchart of FIG. 19.

(S1):
An initializing process is performed in step S1.
Specifically, the screen duplication unit 1A extracts, for example, the image of the area R1 illustrated in FIG. 18 from the input image Din, sets the extracted image to the image D1, and acquires the image size of the image D1 or the upper left endpoint coordinates and the lower right endpoint coordinates of the image D1. The following description is based on the assumption that Ps (x, y)=(0,0), Pe (x, y)=(X_SIZE−1,Y_SIZE−1), where the size in the x-direction of the image size of the image D1 is X_SIZE, the size in y-direction is Y_SIZE, the upper left endpoint Ps coordinates of the image D1 is indicated as Ps (x, y), and the lower right endpoint Pe coordinates of the image D1 is indicated as Pe (x, y).

Furthermore, the pixel value of the image D1 on the coordinates (x, y) is indicated as P_in (x, y).
(S2):
A mask process is performed in step S2.
Specifically, the mask area determination unit 2C performs a mask calculation process to the image data P_in (x, y) of the image D1 on the coordinates (x, y). Then, the mask area determination unit 2C acquires the mask calculation result as M (x, y). The mask area determination unit 2C sets the mask calculation result M (x, y) to "1" (value Mt) when determining that the mask calculation result corresponds to the mask area, and sets the mask calculation result M (x, y) to "0" (value Mf) when determining that the mask calculation result does not correspond to the mask area.

(S3):

A mask image acquisition process is performed in step S3.

Specifically, the mask area determination unit 2C determines, based on the mask calculation result M (x, y) acquired in step S2, the pixel value of Pm (x, y) of the mask image on the coordinates (x, y). For example, when the coordinates (x, y) is the mask target area, the R component value of Pm (x, y) is set to "255", and the G component value and the B component value of Pm (x, y) are set to "0". Thus, the pixel of the mask image on the coordinates (x, y) can be displayed in red.

(S4):

An image quality adjustment process is performed in step S4.

Specifically, the image quality adjustment unit 4E performs, based on the mask calculation result M (x, y) acquired in step S2, a predetermined image process to the image D1 (image data P_in (x, y)).

In other words, when (1) M (x, y)=1, the image quality adjustment unit 4E performs the predetermined image process to the image D1 (image data P_in (x, y)) and sets the image process result to P_adj (x, y).

When (2) M (x, y)=0, the image quality adjustment unit 4E does not perform the predetermined image process to the image D1 (image data P_in (x, y)) and sets image data P_in (x, y) of the image D1 to P_adj (x, y).

(S5):

The composite image generation process is performed in step S5.

Specifically, the composition unit 3A composites the image data P_in (x, y) of the image D1, the image data Pm (x, y) of the mask image generated in step S3, and the image data P_adj (x, y) of the image after the image quality adjustment generated in step S4, and acquires the image data P_out (x, y) of the composite image (output image).

For example, when on a screen divided into three, the image D1 is displayed on the left, the mask image D2 is displayed on the middle, the image after the image quality adjustment D4 is displayed on the right similarly to the first embodiment, the composition unit 3A sets P_out (x, y)=P_in (x, y),
P_out (x+X_SIZE, y)=Pm (x, y), and
P_out (x+2×X_SIZE, y)=P_adj (x, y), and acquires the image data P_out (x, y) of the composite image (output image).

Thus, (1) P_in (x, y) (image D1) is displayed at the position of the composite image (output image) on the coordinates (x, y), (2) Pm (x, y) (mask image D2) is displayed at the position of the composite image (output image) on the coordinates (x+X_SIZE, y), and (3) P_in (x, y) (image after the image quality adjustment D4) is displayed at the position of the composite image (output image) on the coordinates (x+2×X_SIZE, y).

(S6-S9):

The value of x is incremented by 1 in step S6.

Then, the incremented value of x is compared with the image size X_SIZE in the x-direction of the image D1 in step S7. The process proceeds to step S8 when the value of x is equal to or larger than X_SIZE, and the process returns to step S2 when the value is smaller than X_SIZE.

The value of y is incremented by 1 in step S8. Then, the incremented value of y is compared with the image size Y_SIZE in the y-direction of the image D1 in step S9. The process is terminated when the value of y is equal to or larger than Y_SIZE, and the process returns to step S2 when the value is smaller than Y_SIZE.

By performing the above process by the image generation device 3000, it is possible to acquire the output image Dout similar to that of the image generation device 1000 of the first embodiment.

It has been described that the mask calculation result M (x, y) is a binary signal (signal indicates "0" or "1"). The mask calculation result M (x, y) is not limited to the above and may indicate an intermediate value of 0 to 1. In this case, similarly to the first embodiment, the image after the image quality adjustment D4 and the output image Dout may be acquired based on the mask calculation result M (x, y) by performing the internal division process or the like.

It has been described that the number of the mask calculation results M (x, y) calculated by the mask calculation is one. The number of the mask calculation results M (x, y) is not limited to the above and may be two or more similarly to the second embodiment. In this case, the mask image D2 may be generated, for example, so that the process target is displayed in different color for each image process similarly to the second embodiment.

Figure 20:
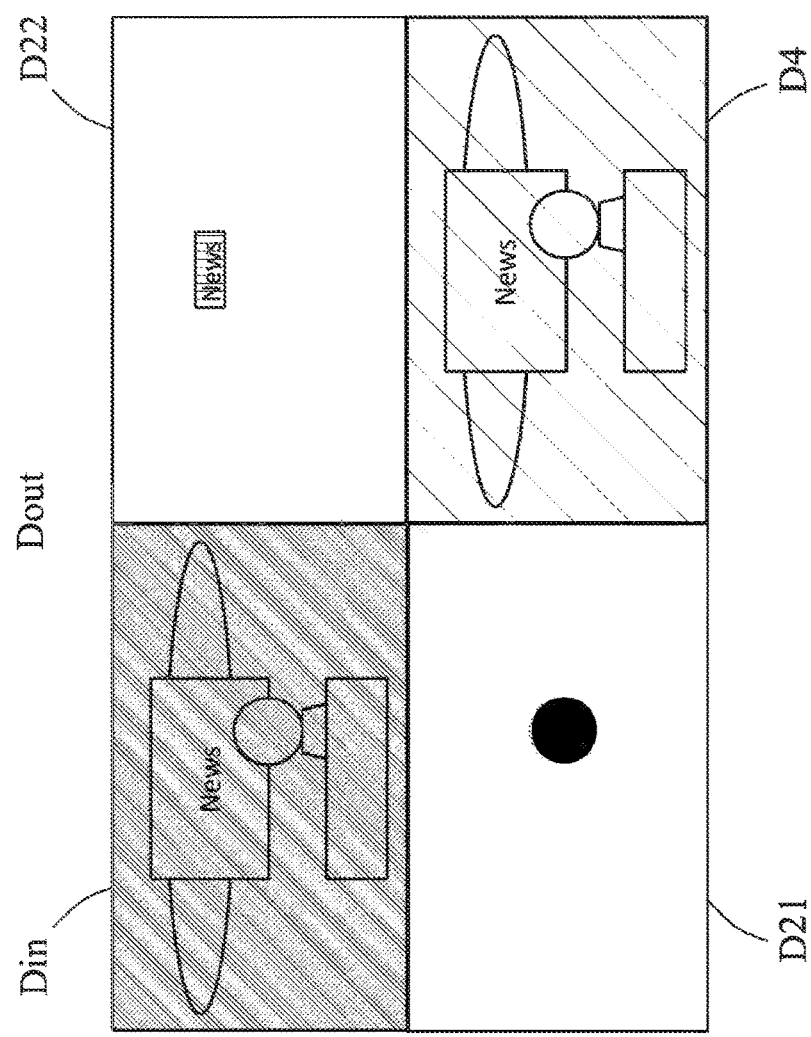
FIG. 20 is a diagram schematically illustrating an example of an image (output image Dout) generated by the image generation device 3000 according to the third embodiment.

It has been described that the image before the image quality adjustment, the mask image, and the image after the image quality adjustment are displayed on a screen divided into three similarly to the first embodiment, but the output image Dout is not limited to the above. For example, the image generation device 3000 may acquire a plurality of mask calculation results M (x, y), generate a plurality of mask images corresponding to them, and generate the output image Dout so that, on a screen divided into four, the input image Din is displayed on the upper left, the first mask image is displayed on the lower left, the second mask image is displayed on the upper right, and the image after the image quality adjustment D4 is displayed on the lower right as illustrated in FIG. 20.

Other Embodiments

In the above embodiments (including modified example), the generated output image is not limited to the images described above. It has been described that a screen is divided into three or four. An output image to be displayed on a screen divided into five or more may be generated.

Furthermore, the order or the position of the images to be displayed on the divided areas is not limited to the above and may be variously changed.

The image generation device or the image generation method may be implemented by combining a part of or all of the above embodiments (including the modified example).

The display device may be implemented by adding a display unit to the above embodiments (including the modified example). A display device which implement the image generation method of the above embodiments may be implemented.

A part of or all of the image generation devices of the above embodiments may be implemented as an integrated circuit (for example, an LSI or a system LSI).

A part of or all of the processes in the functional blocks of the above embodiments may be performed by a program.

Furthermore, a part of or all of the processes in the functional blocks of the above embodiments may be performed by a central processing unit (CPU) of a computer. The program to execute those processes may be stored in a storage device, such as a hard disk or a ROM, and read from a ROM or a RAM, and performed by a central processing unit (CPU).

Moreover, the processes of the above embodiments may be performed by hardware or software (including the case where the processes are performed with an operating system (OS), middleware, or predetermined library). The processes may be performed by a process in which software and hardware are mixed.

When the image generation device according to the above embodiments is implemented by hardware, it is apparent that timing adjustment to perform the processes is necessary. In the above embodiments, details of the timing adjustment for various signals generated in an actual hardware design has been omitted for convenience of explanation. A control signal for the timing adjustment (for example, a vertical synchronizing signal, a horizontal synchronizing signal, or various enable signals) has not been illustrated. A delay unit for the timing adjustment has not been illustrated.

Furthermore, the order of the processes of the above embodiments is not limited to the description of the above embodiments and may be changed without departing from the scope of the invention.

A computer program which causes a computer to execute the processes and a computer-readable recording medium containing the program are included in the scope of the present invention. The computer-readable recording medium includes, for example, a flexible disk, a hard disk, a CD-ROM, an MO, a DVD, a large capacity DVD, a next-generation DVD, and a semiconductor memory.

The computer program is not limited to a program recorded in the recording mediums and may be a program propagated via a network or the like represented by an electric communication line, a wireless or wired communication line, or the internet.

Furthermore, main members required for the above embodiments among the component members of the above embodiments may be simplified and illustrated. Arbitrary component members which has not been illustrated in the above embodiments may be included accordingly. In the above embodiments and the drawings, the size of each member may not faithfully express the actual size and proportion.

Note that, the specific configuration of the present invention is not limited to those in the above embodiments and may be variously changed and modified without departing from the scope of the invention.

Supplemental Notes

Note that, the present invention can be described as follows:

An image generation device having a first configuration includes a screen duplication unit, a mask area determination unit, an image quality adjustment unit, and a composition unit.

The screen duplication unit extracts and outputs at least a part of an image area of an input image as a process target image.

The mask area determination unit determines a mask area of the process target image and generates a mask image specifying the mask area.

The image quality adjustment unit performs a predetermined image process to the mask area, which is determined by the mask area determination unit, of the process target image and outputs the image, to which the image process is performed, as an image after image quality adjustment.

The composition unit generates a composite image in which the process target image, the mask image, and the image after the image quality adjustment are composited so that the process target image, the mask image, and the image after the image quality adjustment are displayed on a display screen.

Thus, the image generation device can generate an image (video) in which (1) the image before the image quality adjustment (the process target image extracted by the screen duplication unit), (2) the image specifying the mask area (image quality adjustment process target area), and (3) the image after the image quality adjustment are arranged on a screen. In other words, by viewing the image (video) generated by the image generation device, a normal user who does not have technical knowledge can recognize that the image quality adjustment process is performed to which image area.

An image generation device having a second configuration, in addition to the first configuration, generates a mask image by determining a first mask area and a second mask area which is different from the first mask area at the mask area determination unit, setting the pixel value of the pixel included in the area in the mask image corresponding to the first mask area to a first pixel value, and setting the pixel value of the pixel included in the area in the mask image corresponding to the second mask area to a second pixel value.

The image quality adjustment unit generates the image after the image quality adjustment by performing a first image process to the image area of the process target image corresponding to the first mask area and performing a second image process, which is different from the first image process, to the image area of the process target image corresponding to the second mask area.

Thus, in the image generation device, it is possible to perform a plurality of image processes to a plurality of mask areas. Furthermore, since the mask image in which different pixel values (the first pixel value and the second pixel value) are set to areas corresponding to a plurality of mask areas can be acquired in the image generation device, a normal user who does not have technical knowledge can easily recognize (confirm) that what kind of image quality adjustment process has been performed to which image area by viewing the images before and after the image quality adjustment while referring to the mask image.

An image generation device having a third configuration, in addition to the first or second configuration, composites the process target image, the mask image, and the image after the image quality adjustment at the composition unit so that the mask image is displayed between the process target image and the image after the image quality adjustment.

Thus, in the image generation device, the mask image is displayed between the image before the image quality adjustment and the image after the image quality adjustment, and it is possible to easily confirm the mask area (process target area) without largely moving a visual line.

An image generation device having a fourth configuration, in addition to any one of the first to third configurations, includes a mask parameter to adjust calculation accuracy of the mask calculation process to be performed to determine the mask area at the mask area determination unit and an adjustment parameter input unit to set a process intensity parameter to adjust image process intensity at the image quality adjustment unit.

The mask area determination unit determines, based on the mask parameter, the mask area of the process target image.

The image quality adjustment unit performs an image process with the process intensity set according to the process intensity parameter.

Thus, in the image generation device, it is possible to adjust the mask area (process target area) and the process intensity of the image quality adjustment process with independent parameters. As a result, by checking the image (video) generated by the image generation device on the display screen, a normal user can appropriately confirm the image quality adjustment effect while grasping both of the mask area (process target area) and the process intensity of the image quality adjustment process.

The "mask calculation process" is the process to be performed to determine the mask area. For example, when a skin color area is set to the mask area (process target area), a calculation process to determine the skin color component inclusion degree in the image area according to an image feature amount which is extracted from an image area is equivalent to the "mask calculation process".

A display device having a fifth configuration includes the image generation device having any one of the first to fourth configurations and a display unit on which the image generated by the image generation device is displayed.

Thus, it is possible to implement a display device using the image generation device having any one of the first to fourth configurations.

INDUSTRIAL APPLICABILITY

According to the present invention, an image (video), in which (1) the image before the image quality adjustment, (2) the image indicating the mask area (image quality adjustment process target area), and (3) the image after the image quality adjustment are arranged and displayed on a screen, can be generated, and it is possible to easily appropriately recognize the image quality adjustment effect by viewing the generated image. The present invention is useful in an image (video) related industrial field and applicable to the field.

REFERENCE SIGNS LIST 1000, 1000A, 2000, 3000 image generation device
1 screen duplication unit
2, 2A, 2B, 2C mask area determination unit
3, 3A composition unit
4, 4A, 4B, 4C, 4D, 4E image quality adjustment unit

The invention claimed is:

1. An image generation device comprising:
a screen duplication circuit that extracts at least a portion of an image area of an input image as a process target image and outputs a composite duplicate image in which at least three of the process target images are arranged next to each other;
a mask area determination circuit that determines a mask area of the process target image and generates a mask image specifying the mask area;
an image quality adjustment circuit that performs a predetermined image process to the process target image in the mask area determined by the mask area determination circuit and output an image to which the image process is performed as an image after image quality adjustment; and
a composition circuit that generates a composite image in which the process target image, the mask image, and the image after the image quality adjustment are composited such that the process target image, the mask image, and the image after the image quality adjustment are displayed on a screen by replacing one of the process target images in the composite duplicate image with the mask image and replacing another one of the process target images in the composite duplicate image with the image after the image quality adjustment; wherein
the composition circuit composites the process target image, the mask image, and the image after the image quality adjustment such that the mask image is displayed between the process target image and the image after the image quality adjustment.

2. The image generation device according to claim 1, wherein
the mask area determination circuit generates the mask image by determining a first mask area and a second mask area which is different from the first mask area by setting a pixel value of a pixel included in an area in the mask image corresponding to the first mask area to a first pixel value and setting a pixel value of a pixel included in an area in the mask image corresponding to the second mask area to a second pixel value, and
the image quality adjustment circuit generates the image after the image quality adjustment by performing a first image process to an image area of the process target image corresponding to the first mask area and performing a second image process which is different from the first image process to an image area of the process target image corresponding to the second mask area.

3. The image generation device according to claim 2, further comprising:
a mask parameter to adjust calculation accuracy of a mask calculation process to be performed to determine the mask area at the mask area determination circuit; and
an adjustment parameter input circuit that sets a process intensity parameter to adjust intensity of an image process at the image quality adjustment circuit, wherein
the mask area determination circuit determines, based on the mask parameter, the mask area at the process target image, and
the image quality adjustment circuit performs the image process with the process intensity set based on the process intensity parameter.

4. The image generation device according to claim 1, further comprising:
a mask parameter to adjust calculation accuracy of a mask calculation process to be performed to determine the mask area at the mask area determination circuit; and
an adjustment parameter input circuit that sets a process intensity parameter to adjust intensity of an image process at the image quality adjustment circuit, wherein
the mask area determination circuit determines, based on the mask parameter, the mask area at the process target image, and
the image quality adjustment circuit performs the image process with the process intensity set based on the process intensity parameter.

5. A display device comprising:
an image generation device according to claim 1; and
a display that displays an image generated by the image generation device.

6. An image generation method comprising:
a screen duplication step of extracting at least a portion of an image area of an input image as a process target image and outputting a composite duplicate image in which at least three of the process target images are arranged next to each other;

a mask area determination step of determining a mask area of the process target image and generating a mask image specifying the mask area;

an image quality adjustment step of performing a predetermined image process to the process target image in the mask area determined by the mask area determination step and outputting an image to which the image process is performed as an image after image quality adjustment; and a composition step of generating a composite image in which the process target image, the mask image, and the image after the image quality adjustment are composited such that the process target image, the mask image, and the image after the image quality adjustment are displayed on a screen by replacing one of the process target images in the composite duplicate image with the mask image and replacing another one of the process target images in the composite duplicate image with the image after the image quality adjustment; wherein the composition step composites the process target image, the mask image, and the image after the image quality adjustment such that the mask image is displayed between the process target image and the image after the image quality adjustment.

7. The image generation method according to claim 6, wherein the mask area determination step generates the mask image by determining a first mask area and a second mask area which is different from the first mask area by setting a pixel value of a pixel included in an area in the mask image corresponding to the first mask area to a first pixel value and setting a pixel value of a pixel included in an area in the mask image corresponding to the second mask area to a second pixel value, and the image quality adjustment step generates the image after the image quality adjustment by performing a first image process to an image area of the process target image corresponding to the first mask area and performing a second image process which is different from the first image process to an image area of the process target image corresponding to the second mask area.

8. The image generation method according to claim 6, further comprising:

a mask parameter to adjust calculation accuracy of a mask calculation process to be performed to determine the mask area at the mask area determination step; and an adjustment parameter input step of setting a process intensity parameter to adjust intensity of an image process at the image quality adjustment step, wherein the mask area determination step determines, based on the mask parameter, the mask area at the process target image, and the image quality adjustment step performs the image process with the process intensity set based on the process intensity parameter.

* * * * *